(12) United States Patent
Choi et al.

(10) Patent No.: US 11,638,060 B2
(45) Date of Patent: *Apr. 25, 2023

(54) ELECTRONIC APPARATUS AND CONTROL METHOD THEREOF

(71) Applicant: SAMSUNG ELECTRONICS CO., LTD., Suwon-si (KR)

(72) Inventors: Kilsoo Choi, Suwon-si (KR); Jongin Lee, Suwon-si (KR); Sehyun Kim, Suwon-si (KR); Kwansik Yang, Suwon-si (KR); Jaesoon Lee, Suwon-si (KR); Dahee Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,398

(22) Filed: Jan. 11, 2022

(65) Prior Publication Data

US 2022/0132198 A1 Apr. 28, 2022

Related U.S. Application Data

(63) Continuation of application No. 17/097,722, filed on Nov. 13, 2020, now Pat. No. 11,240,550.

(30) Foreign Application Priority Data

Nov. 15, 2019 (KR) .......................... 10-2019-0146280

(51) Int. Cl.
*H04N 21/43* (2011.01)
*H04N 21/41* (2011.01)
(Continued)

(52) U.S. Cl.
CPC ..... *H04N 21/4307* (2013.01); *H04N 21/4126* (2013.01); *H04N 21/4363* (2013.01); *H04N 21/44004* (2013.01); *H04N 21/472* (2013.01)

(58) Field of Classification Search
CPC ........... H04N 21/4307; H04N 21/4126; H04N 21/4363; H04N 21/44004; H04N 21/472;
(Continued)

(56) References Cited

U.S. PATENT DOCUMENTS 10,203,856 B2 2/2019 Kim
10,353,661 B2 7/2019 Choi et al.
(Continued)

FOREIGN PATENT DOCUMENTS

CN 105930073 A 9/2016
CN 107257954 A 10/2017
(Continued)

OTHER PUBLICATIONS

International Search Report (PCT/ISA/210) and Written Opinion (PCT/ISA/237) dated Mar. 10, 2021 issued by the International Searching Authority in International Application No. PCT/KR2020/015833.
(Continued)

*Primary Examiner* — John R Schnurr
(74) *Attorney, Agent, or Firm* — Sughrue Mion, PLLC

(57) ABSTRACT

An electronic apparatus includes: a display; a communication circuit configured to communicate with an external apparatus; and a processor. The processor is configured to: transmit, to the external apparatus, a request to receive information on a screen which is currently displayed on the external apparatus, receive, from the external apparatus, a response corresponding to the request, based on the response, identify a number of contents displayed in the screen, based on identifying that a plurality of contents is displayed in the screen, display a UI on the display for selecting one among the plurality of contents, in response to a content, among the plurality of contents, being selected by a user input through the UI, transmit a signal indicating the
(Continued)

selected content to the external apparatus, and receive, from the external apparatus, data corresponding to the content to display an image on the display.

18 Claims, 18 Drawing Sheets

(51) Int. Cl.
*H04N 21/4363* (2011.01)
*H04N 21/44* (2011.01)
*H04N 21/472* (2011.01)

(58) Field of Classification Search
CPC ............ H04N 21/4122; H04N 21/482; H04N 21/41407; H04N 21/43076; H04N 21/43637; H04N 21/4104; H04N 21/43; H04N 21/433; H04N 21/462; H04N 21/41265; H04N 21/43615; H04N 21/4316; G06N 3/0454; G06N 3/08; G06N 20/00; G06F 3/0416
See application file for complete search history.

(56) References Cited

U.S. PATENT DOCUMENTS

| | | | |
|---|---|---|---|
| 11,093,046 | B2 | 8/2021 | Hassan |
| 2009/0222874 | A1 | 9/2009 | White et al. |
| 2013/0050274 | A1 | 2/2013 | Yamada et al. |
| 2013/0254291 | A1 | 9/2013 | Park et al. |
| 2014/0002389 | A1* | 1/2014 | Kim ................. H04N 21/43615 345/1.3 |
| 2014/0104137 | A1 | 4/2014 | Brown |
| 2015/0082184 | A1 | 3/2015 | Kim et al. |
| 2015/0195515 | A1 | 7/2015 | Lee |
| 2015/0195601 | A1 | 7/2015 | Hahm |
| 2015/0195620 | A1 | 7/2015 | Buchner et al. |
| 2015/0341686 | A1 | 11/2015 | Wen |
| 2015/0378665 | A1 | 12/2015 | Han |
| 2016/0210016 | A1 | 7/2016 | Shin et al. |
| 2016/0253083 | A1 | 9/2016 | Lee et al. |
| 2016/0253142 | A1 | 9/2016 | Choi et al. |
| 2016/0316172 | A1 | 10/2016 | Jaynes |
| 2017/0230453 | A1 | 8/2017 | Verma et al. |
| 2017/0237931 | A1 | 8/2017 | Lee et al. |
| 2017/0255442 | A1 | 9/2017 | Kim et al. |
| 2017/0332134 | A1 | 11/2017 | Iwami et al. |
| 2018/0048933 | A1 | 2/2018 | Yamaura |
| 2018/0074594 | A1 | 3/2018 | Herz |
| 2018/0077442 | A1 | 3/2018 | Herz |
| 2018/0205983 | A1 | 7/2018 | Lee et al. |
| 2018/0364881 | A1 | 12/2018 | Lee et al. |
| 2019/0026064 | A1 | 1/2019 | Jeon et al. |
| 2019/0187873 | A1 | 6/2019 | Kim et al. |
| 2019/0320219 | A1 | 10/2019 | Yoden |
| 2020/0057596 | A1 | 2/2020 | Kim et al. |

FOREIGN PATENT DOCUMENTS

| | | |
|---|---|---|
| CN | 108713185 A | 10/2018 |
| CN | 110012327 A | 7/2019 |
| KR | 10-2016-0031724 A | 3/2016 |
| KR | 1020170004481 A | 1/2017 |
| KR | 1020190056523 A | 5/2019 |

OTHER PUBLICATIONS

Communication dated Mar. 18, 2021 issued by the European Patent Office in application No. 20206538.9.
Notice of Allowance dated Sep. 22, 2021 issued by the United States Patent and Trademark Office in U.S. Appl. No. 17/097,722.
Communication dated Oct. 10, 2022 issued by the National Intellectual Property Administration of P.R. China in Chinese Application No. 202011267574.7.
Communication dated Oct. 19, 2022 issued by Intellectual Property India in Indian Application No. 202217032525.

* cited by examiner

ELECTRONIC APPARATUS AND CONTROL METHOD THEREOF

CROSS-REFERENCE TO RELATED APPLICATIONS

This a continuation of U.S. application Ser. No. 17/097,722 filed on Nov. 13, 2020, which is based on and claims priority under 35 U.S.C. § 119 to Korean Patent Application No. 10-2019-0146280, filed on Nov. 15, 2019, the disclosures of which are incorporated by reference herein in their entireties.

BACKGROUND

Field

The disclosure relates to an electronic apparatus configured to provide video content to an external apparatus such as a display apparatus or to control an operation of the display apparatus, and, more particularly, to an electronic apparatus transmitting video content to an external apparatus in response to a request from the external apparatus, and a control method thereof.

Discussion of Related Art

The electronic apparatus may be an information processing apparatus such as a PC or a server that processes general-purpose information, an image processing apparatus that processes image data, an audio apparatus that processes audio, a household appliance that performs household chores, and/or a display apparatus that displays the processed image data as an image on a display panel.

The display apparatus may be a stationary apparatus installed at a location, for example, such as a television (TV), and a portable apparatus that a user may carry, such as a mobile device. With the development of the wireless communication environments and the mobile devices such as smartphones and tablets that may utilize the wireless communication, many users are using personal mobile devices. Accordingly, the demand for a linkage operation between a plurality of display apparatuses, for example, between a mobile device and a TV has been increased. The linkage operation is based on the wireless communication between apparatuses because of convenience, and one example thereof may include mirroring.

The mirroring refers to a function in which an image displayed on a first display apparatus is identically displayed on a second display apparatus. For example, while a content image is displayed on a screen of the first display apparatus, the first display apparatus transmits content data buffered in a buffer of the first display apparatus to the second display apparatus in real time to display the content image. The second display apparatus displays the same image as the content image displayed on the first display apparatus based on the content data received from the first display apparatus.

Due to the characteristics of mirroring, the screen displayed on the first display apparatus is displayed in the second display apparatus as is. The first display apparatus may display a multi-view screen in which a plurality of content images are displayed on one screen. If the second display apparatus simply mirrors the screen of the first display apparatus, a multi-view screen is displayed on the second display apparatus as is. In order for one content image of the multi-view screen to be displayed on the second display apparatus, the screen of the first display apparatus needs to be first switched so that only the corresponding content image is displayed on the first display apparatus. Afterwards, since the second display apparatus displays a mirrored screen of the screen displayed on the first display apparatus, only the corresponding content image will be displayed on the second display apparatus.

SUMMARY

According to an aspect of the disclosure, there is provided an electronic apparatus including: a display; a communication circuit; and a processor configured to: display an image on the display, in response to receiving a request for transmitting content of the image from an external apparatus through the communication circuit, identify whether or not to perform an operation for selecting content based on a number of content included in the image, based on the identifying to perform the operation for selecting the content, receive a user input for selecting the content from the external apparatus, and transmit data of the content, which is selected from a plurality of contents in the image according to the user input, to the external apparatus through the communication circuit, and based on the identifying to not perform the operation for selecting the content, transmit data of the image displayed on the display to the external apparatus.

The processor may be further configured to: identify to perform the operation for selecting the content based on the image being a multi-view screen, and identify to not perform the operation for selecting the content based on the image being a single view screen.

The processor may be further configured to: based on the identifying to perform the operation for selecting the content, transmit information regard to the plurality of contents included in the image to the external apparatus, and receive the user input selecting one of the plurality of contents from the external apparatus.

The processor may be further configured to, based on the user input, transmit the data of the content selected from the plurality of contents buffered to be displayed as the image on the display, to the external apparatus.

The electronic may further include: a storage configured to store data file of the content, wherein the processor may be further configured to transmit the data file of the content stored in the storage to the external apparatus.

The processor may be further configured to, based on the user input, transmit address information of a server storing the data of the content to the external apparatus.

The processor may be further configured to: receive, from the external apparatus, the user input including coordinate information indicating a touch position on a screen of the external apparatus while a mirrored screen corresponding to the plurality of contents displayed on the display is displayed on the external apparatus, identify a position on the display corresponding to the coordinate information, and identify content corresponding to the identified position among the plurality of contents, as the selected content.

The processor may be further configured to process a partial area designated by area information to be displayed on the external apparatus based on receiving the area information designating the partial area of the image displayed on the display from the external apparatus.

The processor may be further configured to: select data corresponding to the partial area among data of the image displayed on the display, and transmit the selected data to the external apparatus.

The processor may be further configured to transmit data of the image displayed on the display and identification information for identifying the partial area in the image to the external apparatus.

The processor may be further configured to: identify to perform the operation for selecting the content based on a plurality of contents being included in the image, and identify to not perform the operation for selecting the content based on a single content being included in the image.

According to an aspect of the disclosure, there is provided a control method of an electronic apparatus, the control method including: displaying an image on a display of the electronic apparatus; in response to receiving a request for transmitting content of the image from an external apparatus, identifying whether or not to perform an operation for selecting content based on a number of content included in the image; based on the identifying to perform the operation for selecting the content, receiving a user input for selecting the content from the external apparatus, and transmitting data of the content, which is selected from a plurality of contents in the image according to the user input, to the external apparatus; and based on the identifying to not perform the operation for selecting the content, transmitting data of the image displayed on the display to the external apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, certain embodiments will be described in detail with reference to the accompanying drawings. Embodiments described with reference to each drawing are not mutually exclusive configurations unless otherwise specified, and a plurality of embodiments may be selectively combined and implemented in one device. The combination of the plurality of embodiments may be arbitrarily selected and applied by a person skilled in the art.

As used herein, the terms such as "1st" or "first," "2nd" or "second," etc., may modify corresponding components regardless of importance or order and are used to distinguish one component from another without limiting the components. Terms used herein are applied to describe embodiments, and are not limiting.

In addition, in the case where the expression "at least one" of a plurality of components appears, the expression refers to not only all of a plurality of components, but each one excluding the rest of the plurality of components or all combinations thereof.

Figure 1:
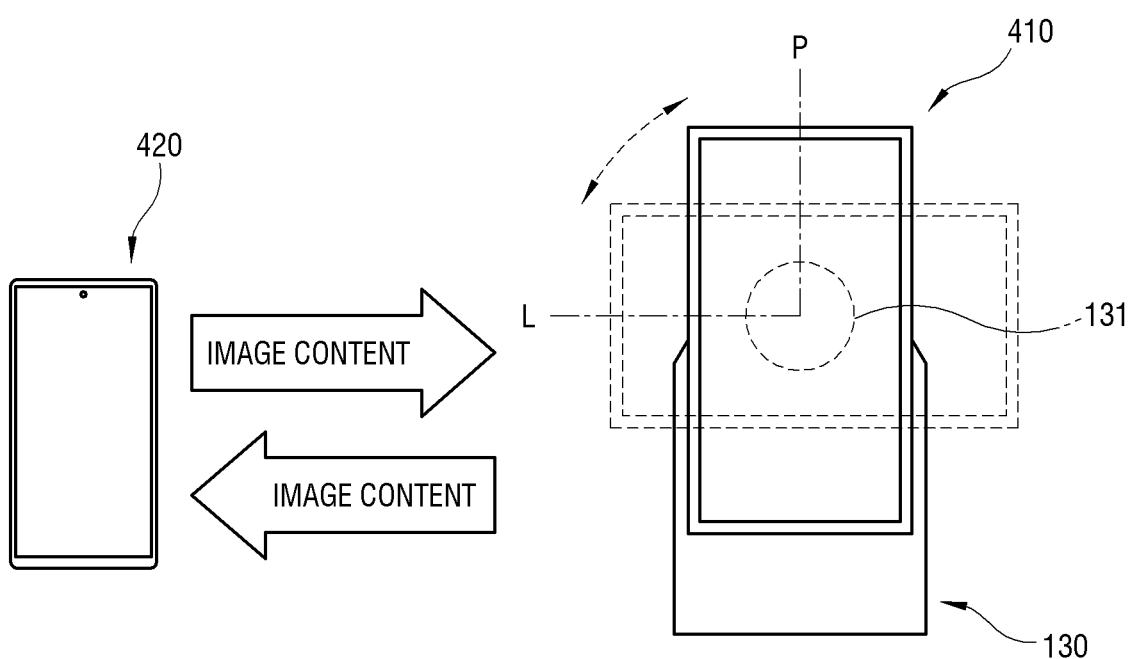
FIG. 1 is an exemplary diagram of a first display apparatus and a second display apparatus according to an embodiment.

FIG. 1 is an exemplary diagram of a first display apparatus and a second display apparatus according to an embodiment.

As illustrated in FIG. 1, a plurality of electronic apparatuses, e.g., a first display apparatus 410, and one or more external apparatuses, e.g., one or more second display apparatuses 420, are provided to communicate with each other, and each is implemented as a display apparatus capable of displaying an image.

An embodiment illustrates a case where the first display apparatus 410 is implemented as a TV, and the second display apparatus 420 is implemented as a mobile device. A variety of design changes may be applied as to by what type of device each first and second electronic apparatus 410 and 420 is implemented, and therefore, the example of an embodiment does not limit the implementation method of the first and second electronic apparatuses 410 and 420. The first display apparatus 410 or the second display apparatus 420 may be implemented as various types of devices having a screen for displaying an image, such as a smart phone, a tablet, a multimedia player, and a wearable device that may be portable, or a TV, a digital signage, an electronic frame, or a computer body having a monitor that are fixedly installed at any one location.

The first display apparatus 410 may be a display apparatus having a fixed screen, or may be a display apparatus having a pivotable screen. The first display apparatus 410 having the latter structure has a stand 130 installed on a mounting surface, and is rotatably supported on one side of the stand 130. The stand 130 has a motor 131 connected to a rear of the first display apparatus 410 and rotates the first display apparatus 410 by driving the motor 131. The operation of the motor 131 may be controlled according to the received control signal. The control signal transmitted to the motor 131 may be generated from a controller provided on the stand 130 or may be transmitted from the first display apparatus 410. In addition, a generation instruction of the control signal may be transmitted from the stand 130 or a remote controller provided in the first display apparatus 410.

Alternatively, only the display panel forming the screen in the first display apparatus 410 may be provided to rotate. That is, a configuration including a processor other than the display panel forms a main body, and a configuration in which the display panel rotates with respect to the main body is also possible.

The first display apparatus 410 is provided to pivot around a central area of a screen for displaying an image. The first display apparatus 410 may rotate at least between a P position and an L position. When the first display apparatus 410 is in the P position, the first display apparatus 410 is in a longitudinal mode or a portrait mode in which a vertical length is longer than a horizontal length, and when the first display apparatus 410 is in the L position, the first display apparatus 410 is in a transverse mode or a landscape mode in which the horizontal length is longer than the vertical length.

An image or a UI displayed on the first display apparatus 410 may correspond to one of a portrait type and a landscape type. Of course, the first display apparatus 410 may display a landscape type image in the portrait mode, and conversely, may display a portrait type image in the landscape mode. However, in this case, in the ratio of the horizontal length and the vertical length, the case of the screen and the case of the image do not match each other. That is, in this case, a margin, which is an area in which an image is not displayed on the screen of the first display apparatus 410, relatively increases. In addition, some UIs or images are designed to fit the landscape type or the portrait type.

Accordingly, the first display apparatus 410 displays the portrait type image in the portrait mode, and displays the landscape type image in the landscape mode. For example, when the first display apparatus 410 displays a broadcast image, the first display apparatus 410 operates in the landscape mode. Alternatively, when the first display apparatus 410 displays a mirrored image of the second display apparatus 420, the first display apparatus 410 operates in the portrait mode.

The second display apparatus 420 is capable of wireless communication with the first display apparatus 410. The second display apparatus 420 may access the first display apparatus 410 through a wide area network or a local area network. For example, the second display apparatus 420 may communicate with the first display apparatus 410 based on Wi-Fi communication through an access point (AP), or may directly communicate with the first display apparatus 410 based on Bluetooth low energy (BLE).

One of the first and second display apparatuses 410 and 420 according to an embodiment serves as a source device that provides video content, and the other thereof serves as a sink device that receives the video content. The roles of the source device and the sink device may be exchanged between the first and second display apparatuses 410 and 420. For example, while the first display apparatus 410 may provide the video content to the second display apparatus 420, the second display apparatus 420 may provide the video content to the first display apparatus 410.

In this environment, for example, when the first display apparatus 410 transmits the video content to the second display apparatus 420, various transmission protocols for the video content, such as a mirroring type and a cast type, are possible. When the mirroring type is applied, the first display apparatus 410 transmits screen data currently displayed to the second display apparatus 420 as is, so the screen state currently displayed is displayed on the screen of the second display apparatus 420 as is.

Figure 2:
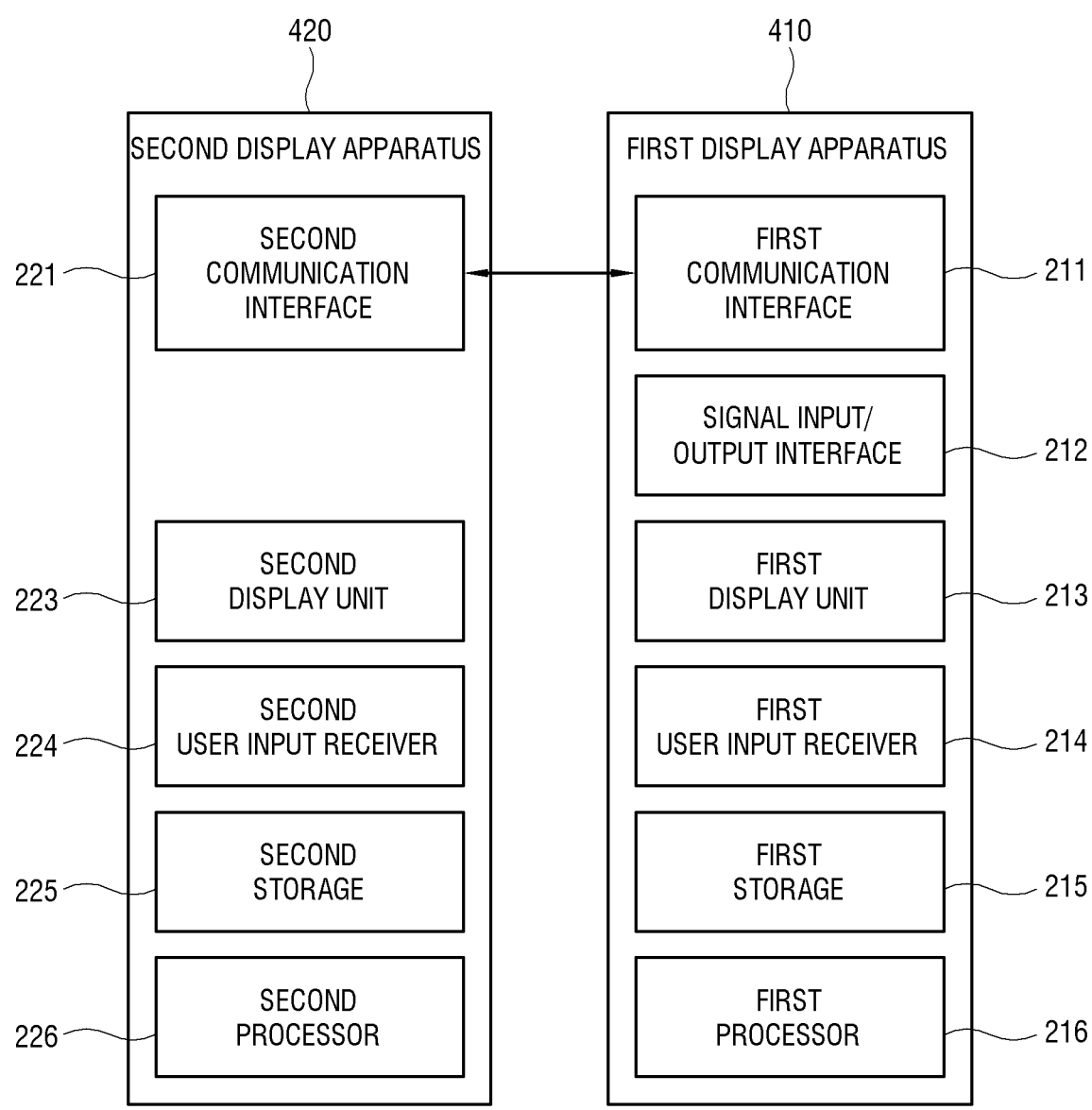
FIG. 2 is a configuration block diagram of the first display apparatus and the second display apparatus according to an embodiment.

FIG. 2 is a configuration block diagram of the first display apparatus and the second display apparatus according to an embodiment.

As illustrated in FIG. 2, a first display apparatus 410 includes a first communication interface 211, a signal input/output interface 212, a first display unit 213, a first user input receiver 214, a first storage 215, and a first processor 216. A second display apparatus 420 includes a second communication interface 221, a second display unit 223, a second user input receiver 224, a second storage 225, and a second processor 226. The first display apparatus 410 and the second display apparatus 420 may further include additional components in addition to the above components, or might not include some of the above components.

The first communication interface 211 is a two-way communication circuit that includes at least one of components such as communication modules and communication chips corresponding to various types of wired and wireless communication protocols. The first communication interface 211 supports one or more wireless communication standards, and includes a communication circuit, a communication chip, or a communication module for performing communication based on each wireless communication standard. For example, the first communication interface 211 includes a communication circuit for one-to-one short-range communication, such as Bluetooth or BLE according to the IEEE 802.15 standard. In addition, the first communication interface 211 includes a communication circuit for performing communication based on a wide area network, such as wireless LAN communication or Wi-Fi according to the IEEE 802.11 standard. Accordingly, the first communication interface 211 may communicate with the second display apparatus 420, an external apparatus, or a server.

The signal input/output interface 212 is wired to an external apparatus such as a set-top box or an optical media player in a one-to-one or one-to-many manner, thereby receiving or outputting data from or to a corresponding external apparatus. The signal input/output interface 212 includes a connector, a port, or the like according to a transmission standard, such as a High-Definition Multimedia Interface (HDMI) port, a DisplayPort, and a USB port.

The first display unit 213 includes a display panel that may display an image on a screen. The display panel is provided as a light-receiving structure such as a liquid crystal or a self-luminous structure such as an organic light emitting device (OLED). The first display unit 213 may further include additional components according to the structure of the display panel. For example, if the display panel is a liquid crystal type, the first display unit 213 includes a liquid crystal display panel, a backlight unit that supplies light, and a panel driving substrate that drives a liquid crystal of the liquid crystal display panel.

The first user input receiver 214 receives input from a user by including various types of input interface related circuits provided to be manipulated by a user. The first user input receiver 214 may be configured in various forms according to the type of the first display apparatus 410. Examples of the first user input receiver 214 include a mechanical or electronic button unit of the first display apparatus 410, a touch pad, a touch screen installed in the first display unit 213, a remote controller separated from the main body of the first display apparatus 410, and the like.

The first storage 215 stores various data. The first storage 215 includes a storage having a non-volatile property and a memory having a volatile property according to a storage property of stored data. The storage is a medium that may store recorded data even when power is not supplied, and examples of the storage include a flash-memory, a hard-disc drive (HDD), a solid-state drive (HDD), a read only memory (ROM), and the like. A memory is a medium that does not store recorded data while not supplied with power, and examples of the memory include a buffer, a random access memory (RAM), and the like.

The first processor 216 includes one or more hardware processors implemented as a CPU, a chipset, a buffer, a circuit, and the like that are mounted on a printed circuit board, and may be implemented as a system on chip (SOC). The first processor 216 includes modules corresponding to various processes such as a demultiplexer, a decoder, a scaler, an audio digital signal processor (DSP), and an amplifier for image processing. Here, some or all of these modules may be implemented as SOC. For example, a module related to image processing such as a demultiplexer, a decoder, and a scaler may be implemented as an image processing SOC, and an audio DSP may be implemented as a separate chipset from the SOC. As an example, when the first display apparatus 410 is provided to rotate by the motor of the stand, the first processor 216 may be electrically connected to the motor to apply a control signal for driving the motor to the motor.

The first processor 216 may run an operating system of the first display apparatus 410 and apps having various functions. The first processor 216 may reproduce the video content stored in the first storage 215 and display the reproduced video content as an image on the first display unit 213 or provide the corresponding video content to the second display apparatus 420.

The second communication interface 221 is a two-way communication circuit that includes at least one of components such as communication modules and communication chips corresponding to various types of wired and wireless communication protocols. The second communication interface 221 is provided to communicate with the first display apparatus 410, the external apparatus, or the server through an AP by supporting, for example, Wi-Fi-based wireless communication.

The second display unit 223 displays an image signal processed by the second processor 226 as an image.

The second user input receiver 224 includes various types of input interface related circuits that are provided to be manipulated by a user in order to perform user input. For example, the second user input receiver 224 includes a physical or electronic button provided on the second display apparatus 420, a remote controller separated from the main body of the second display apparatus 420, a touch screen structure provided on the second display unit 223, and the like.

The second storage 225 is provided to store data. The second storage 225 includes various types of storages and memories such as a flash memory, a HDD, an SSD, a buffer, and a RAM.

The second processor 226 includes one or more hardware processors implemented as a CPU, a chipset, a buffer, a circuit, and the like that are mounted on a printed circuit board, and may be implemented as a system on chip (SOC).

Under such an environment, for example, the first display apparatus 410 may receive a request for content transmission for image display from the second display apparatus 420 while displaying a content image.

Figure 3:
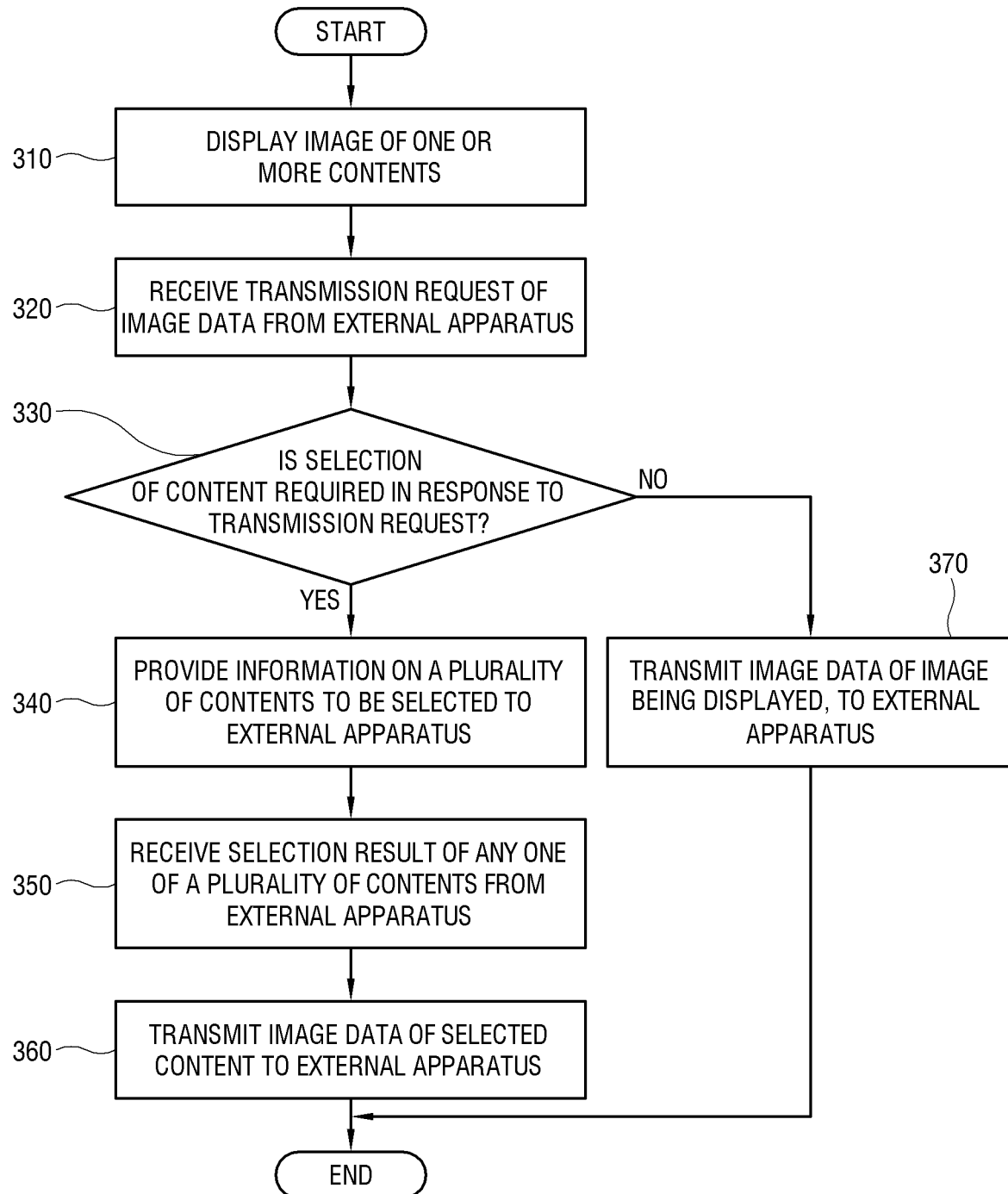
FIG. 3 is a flowchart illustrating a control method of the first display apparatus according to an embodiment.

FIG. 3 is a flowchart illustrating a control method performed by a first processor of a first display apparatus according to an embodiment.

In operation 310, the first display apparatus displays one or more content images.

In operation 320, the first display apparatus receives a transmission request for image data from the external apparatus, that is, the second display apparatus.

In operation 330, the first display apparatus identifies whether or not to perform an operation for selecting content, based on receiving the transmission request. For example, the first display apparatus identifies based on a state of a currently displayed screen or a current processing state of contents whether the number of contents that may be provided to an external apparatus in response to the transmission request is one (that is, the selection of the content to be provided to the external apparatus is not needed) or whether the number of contents that may be provided to the external apparatus in response to a transmission request is plural (that is, the selection of the content to be provided to the external apparatus is needed).

When it is identified that the selection of the content to respond to the transmission request is needed, the first display apparatus transmits information on a plurality of contents identified as requiring the selection to the external apparatus (operation 340).

In operation 350, the first display apparatus receives a result of selecting any one of a plurality of contents indicated by the information from the external apparatus. For example, the external apparatus displays a UI so that the user selects any one of a plurality of pieces of content information indicated by information received from the first display apparatus, and notifies the first display apparatus of identification information of the selected content through the UI.

In operation 360, the first display apparatus transmits the image data of the content selected from the external apparatus to the external apparatus.

On the other hand, when it is identified that the selection of the content to respond to the transmission request is not needed, the first display apparatus transmits the image data of the image being displayed to the external apparatus (operation 370).

In this way, the first display apparatus may cause the second display apparatus to display the image of content desired by a user of the second display apparatus among images currently being displayed on the screen.

The processor of the first display apparatus, e.g., the electronic apparatus may perform at least a part of data analysis, processing, and generation of result information for performing an operation of identifying whether or not to perform the selection of the content in response to the transmission request for the image data from the external apparatus, transmitting the image data of the selected content to the external apparatus according to the user input from the external apparatus based on the identification to select the content, and transmitting the image data of the currently displayed image to the external apparatus based on the identification to not select the content, using at least one of machine learning, a neural network, or a deep learning algorithm as a rule-based or artificial intelligence algorithm.

For example, the processor of the electronic apparatus, e.g., the first processor of the first display apparatus, may perform the functions of a learning unit and a recognition unit together. The learning unit may perform a function of generating a trained neural network, and the recognition unit may perform a function of recognizing (or reasoning, predicting, estimating, and determining) data using the trained neural network. The learning unit may generate or update the neural network. The learning unit may obtain training data to generate the neural network. For example, the learning unit may obtain the training data from the storage of the electronic apparatus or from the outside. The learning data may be data used for training the neural network, and the neural network may be trained using the data performing the above-described operation as the training data.

Before training the neural network using the training data, the learning unit may perform a pre-processing operation on the obtained training data, or select data to be used for training from among a plurality of pieces of training data. For example, the learning unit may process or filter the training data in a format, or add/remove noise to process data in a form suitable for training. The learning unit may generate a neural network configured to perform the above-described operation using the pre-processed training data.

The trained neural network may be constituted by a plurality of neural networks (or layers). The nodes of the plurality of neural networks have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

In order to perform the above-described operation, the recognition unit may obtain target data. The target data may be obtained from the storage of the electronic apparatus or the outside. The target data may be data to be recognized by the neural network. Before applying to the target data to the trained neural network, the recognition unit may perform the pre-processing operation on the obtained target data, or select data to be used for recognition from among a plurality of target data. For example, the recognition unit may process or filter the target data in a format, or add/remove noise to process data in a form suitable for recognition. The recognition unit may obtain an output value output from the neural network by applying the preprocessed target data to the neural network. The recognition unit may obtain a probability value or a reliability value along with the output value.

Figure 4:
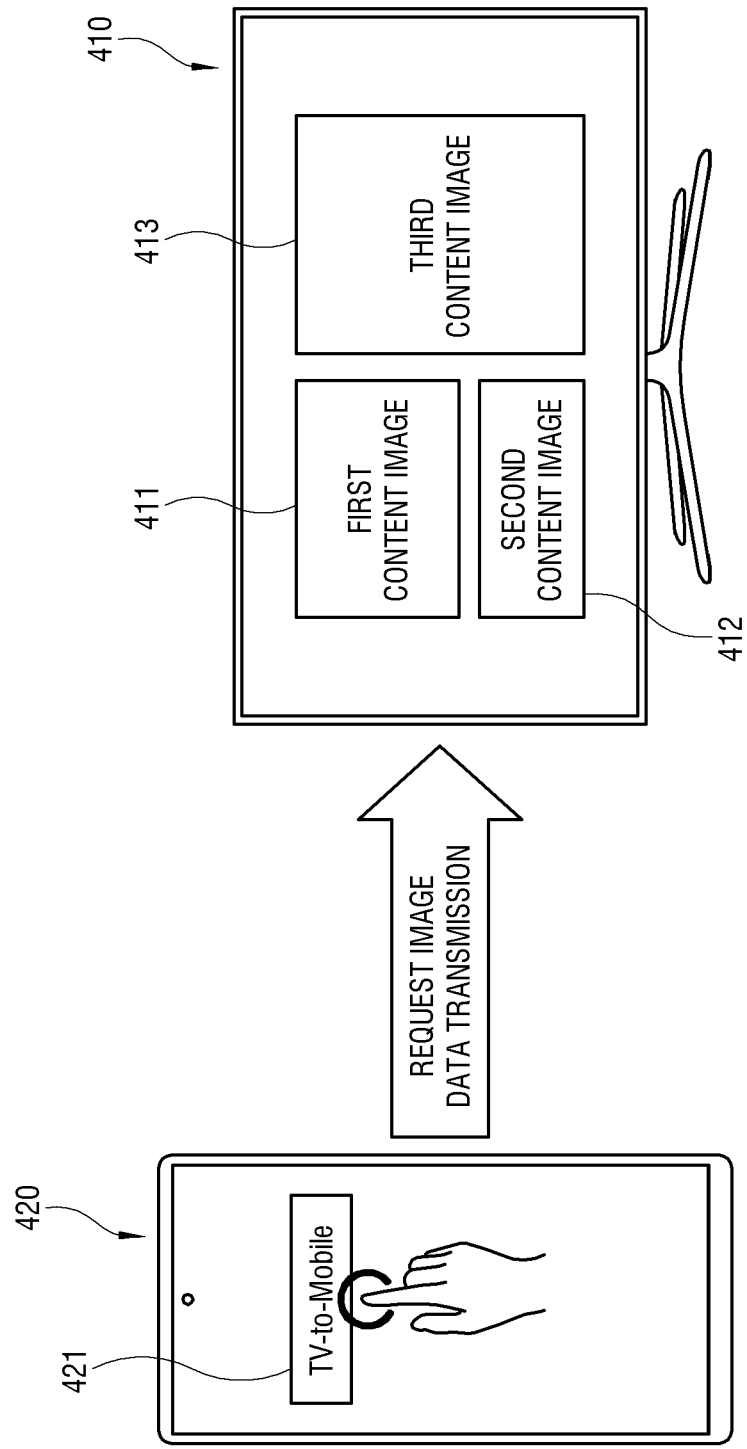
FIG. 4 is an exemplary diagram illustrating a case where a user interface (UI) button is clicked on the second display apparatus while the first display apparatus displays a multi-view screen according to an embodiment.

FIG. 4 is an exemplary diagram illustrating a case where a UI button is clicked on the second display apparatus while the first display apparatus displays a multi-view screen according to an embodiment.

As illustrated in FIG. 4, while a first display apparatus 410 and a second display apparatus 420 are connected to each other so as to communicate with each other, the first display apparatus 410 may display one or more of first, second, and third content images 411, 412, and 413 based on one or more contents on the screen. In an embodiment, the first display apparatus 410 is shown to be a TV whose screen does not pivot, but may be a display apparatus capable of pivoting the screen.

The state of the screen displayed by the first display apparatus 410 may be a single view screen and a multi-view screen according to the number of first, second, and third content images 411, 412, and 413 displayed on the screen. In the multi-view, the first, second, and third content images 411, 412, and 413 of the plurality of contents are displayed on one screen. In an embodiment, a screen state of the first display apparatus 410 indicates a multi-view that displays the first content image 411, the second content image 412, and the third content image 413 on one screen.

In the single view screen, only one content image of one content is displayed on one screen. For example, if the first display apparatus 410 displays only one of the first, second, and third content images 411, 412, and 413 on the screen, the screen state of the first display apparatus 410 may be regarded as a single view.

The first display apparatus 410 may process the image data of the plurality of contents in parallel to implement the multi-view screen. For example, the first display apparatus 410 includes a plurality of decoders, in which each decoder individually decodes the image data of the plurality of content, and mixes the plurality of individually decoded image data into one screen, thereby implementing a final screen to be displayed. The plurality of decoders of the first display apparatus 410 may include, for example, a plurality of hardware decoders, and may include one or more hardware decoders and one or more software decoders.

In this state, the second display apparatus 420 may transmit the transmission request for the image data to the first display apparatus 410. Such a transmission request may designate a specific content, for example. The first display apparatus 410 transmits the image data of the content designated by the transmission request to the second display apparatus 420.

However, a transmission request does not designate a specific content, and content may be requested according to a display state of an image of the first display apparatus 410, a processing state of the content of the first display apparatus 410, or the like, according to an embodiment.

Various methods for generating, by the second display apparatus 420, the transmission request are possible. For example, when the second display apparatus 420 includes a display equipped with a touch screen, a UI button 421 for instructing the generation of the transmission request is displayed on the display. When detecting that the user touches the displayed UI button 421, the second display apparatus 420 transmits the transmission request to the first display apparatus 410.

Hereinafter, an operation of the first display apparatus 410 responding to the request received from the second display apparatus 420 will be described.

Figure 5:
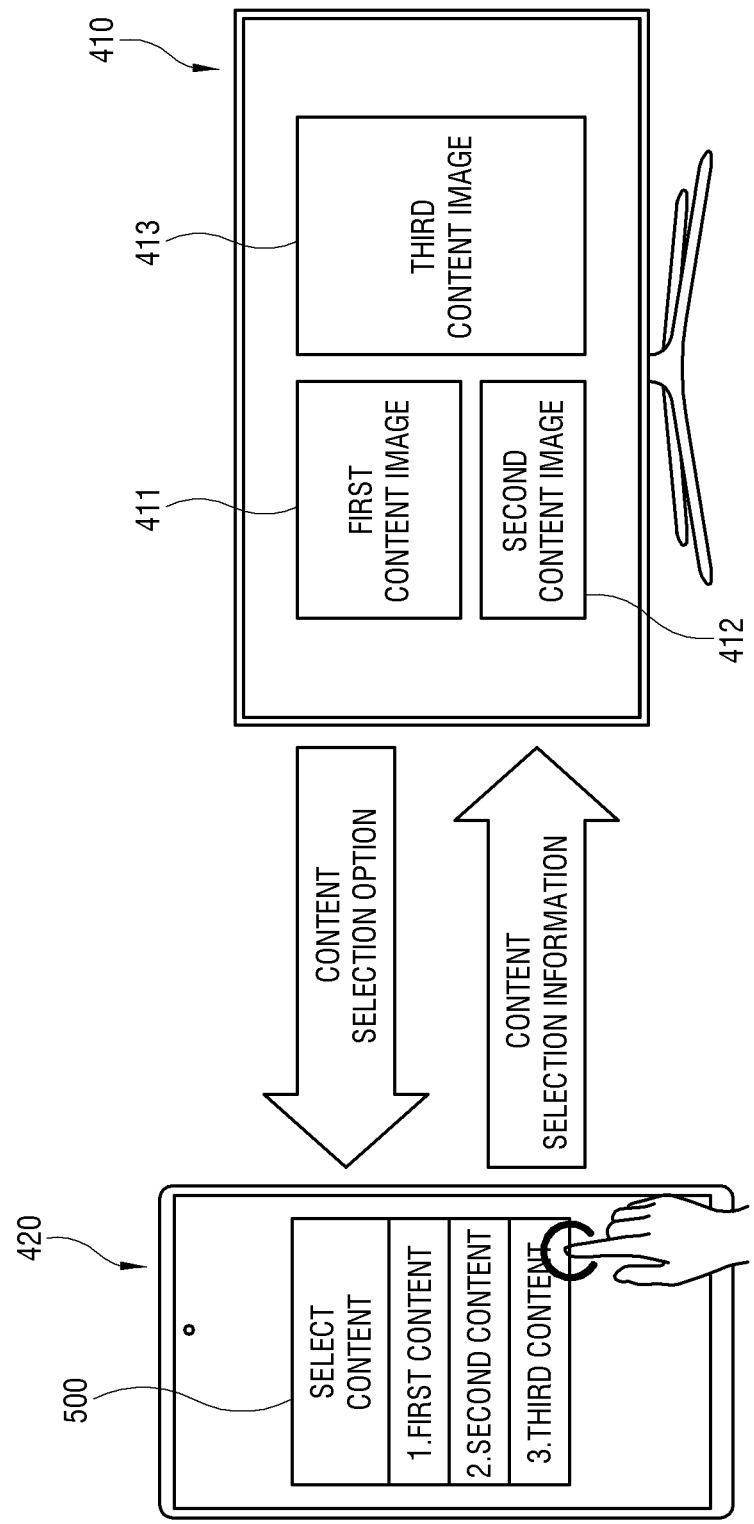
FIG. 5 is an exemplary diagram illustrating an operation of providing, by the first display apparatus, a UI of a content selection option in response to a request from the second display apparatus according to an embodiment.

FIG. 5 is an exemplary diagram illustrating an operation of providing, by the first display apparatus, a UI of a content selection option in response to a request from a second display apparatus according to an embodiment.

As illustrated in FIG. 5, when receiving the transmission request for the image data from the second display apparatus 420, the first display apparatus 410 identifies a current display state of the screen of the first display apparatus 410. For example, the first display apparatus 410 may be a multi-view screen that simultaneously displays a plurality of content images of the first content image 411, the second content image 412, and the third content image 413.

When the screen state is identified, the first display apparatus 410 identifies the content of each of the first, second, and third content images 411, 412, and 413 displayed on the screen. For example, the first display apparatus 410 generates information on a UI 500 that provides an option to select any one of the first content, the second content, and the third content and transmits the information to the second display apparatus 420.

The UI 500 may indicate, for example, identification names of each content by text. However, the UI 500 serves to select one of the plurality of contents identified by the first display apparatus 410, and the form thereof is not limited.

When receiving an input for selecting any one content from the user through the displayed UI 500, the second display apparatus 420 transmits content selection information for identifying the selected content to the first display apparatus 410.

In an embodiment, an example in which the first display apparatus 410 generates the UI 500 and provides the UI 500 to the second display apparatus 420 is described, but the first display apparatus 410 might not generate the UI 500. For example, when the first display apparatus 410 provides information on the plurality of identified contents to the second display apparatus 420, the second display apparatus 420 may generate the UI 500 based on the information.

The information on the plurality of contents may include title information and a thumbnail image as identification information on each of the plurality of contents, and may include information on a display position in the first display apparatus for each of the plurality of contents.

Figure 6:
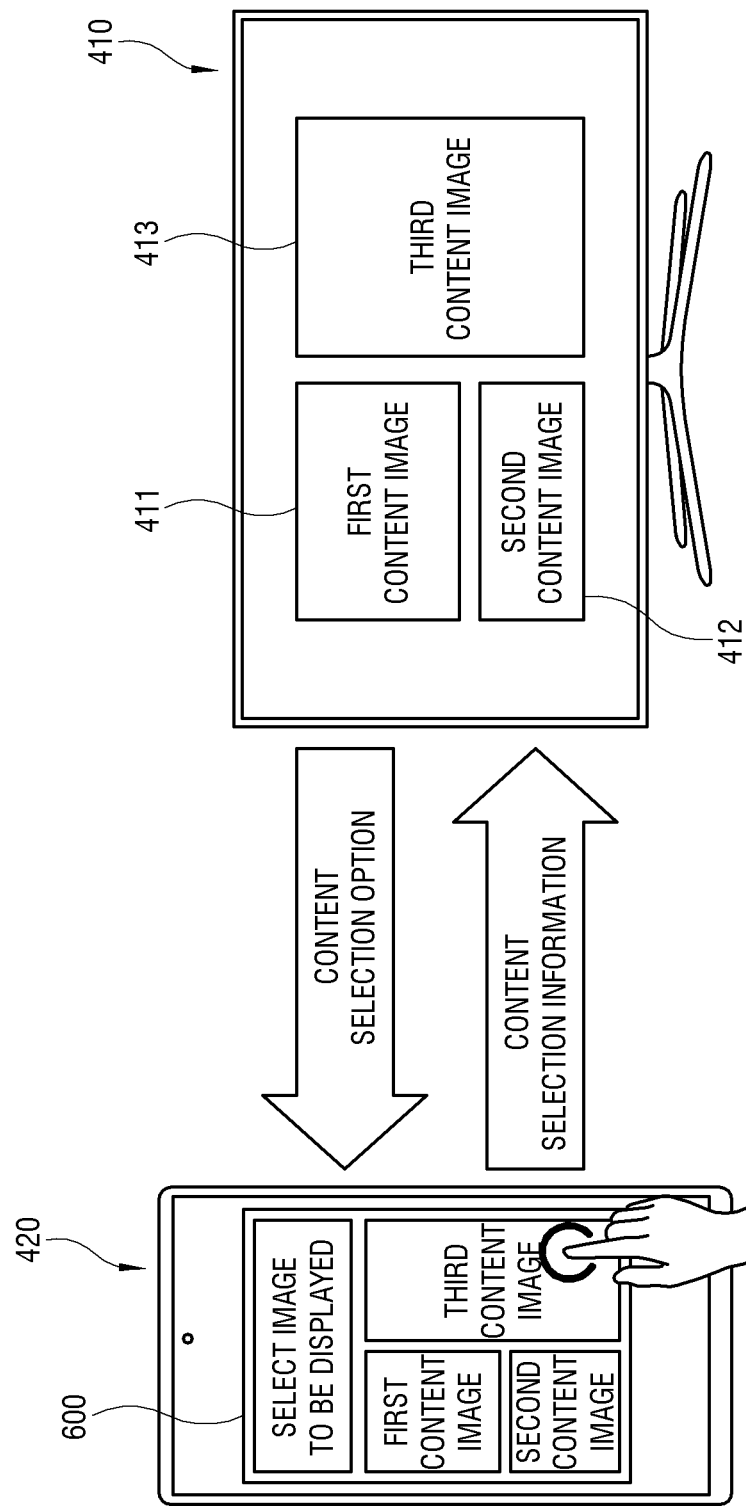
FIG. 6 is an exemplary diagram illustrating an operation of providing, by the first display apparatus, the UI of the content selection option in response to the request from the second display apparatus according to an embodiment.

FIG. 6 is an exemplary diagram illustrating an operation of providing, by the first display apparatus, the UI of the content selection option in response to the request from the second display apparatus according to an embodiment.

As illustrated in FIG. 6, when receiving the transmission request for the image data from the second display apparatus 420, the first display apparatus 410 provides, to the second display apparatus 420, a UI 600 that identifies a current display state of the screen of the first display apparatus 410 and selects the plurality of contents as a result of the identification result. The second display apparatus 420 receives a user input regarding content selection through the displayed UI 600.

The UI 600 includes graphic information obtained by imaging a screen state including the first content image 411, the second content image 412, and the third content image 413 displayed on the first display apparatus 410. The UI 600 may include an image in which the screen of the first display apparatus 410 is captured as is, include a preset thumbnail image of each content image displayed on the screen of the first display apparatus 410, or include a plurality of graphic objects arranged to correspond to a position and size of each content image in the screen of the first display apparatus 410. In this way, the UI 600 may be implemented in various forms such as the captured image of the screen, objects or icons corresponding to each content image, thumbnail images of each content image, and an identification names of each content.

When receiving an input for selecting any one content from the user through the displayed UI 600, the second display apparatus 420 transmits content selection information for identifying the selected content to the first display apparatus 410.

Figure 7:
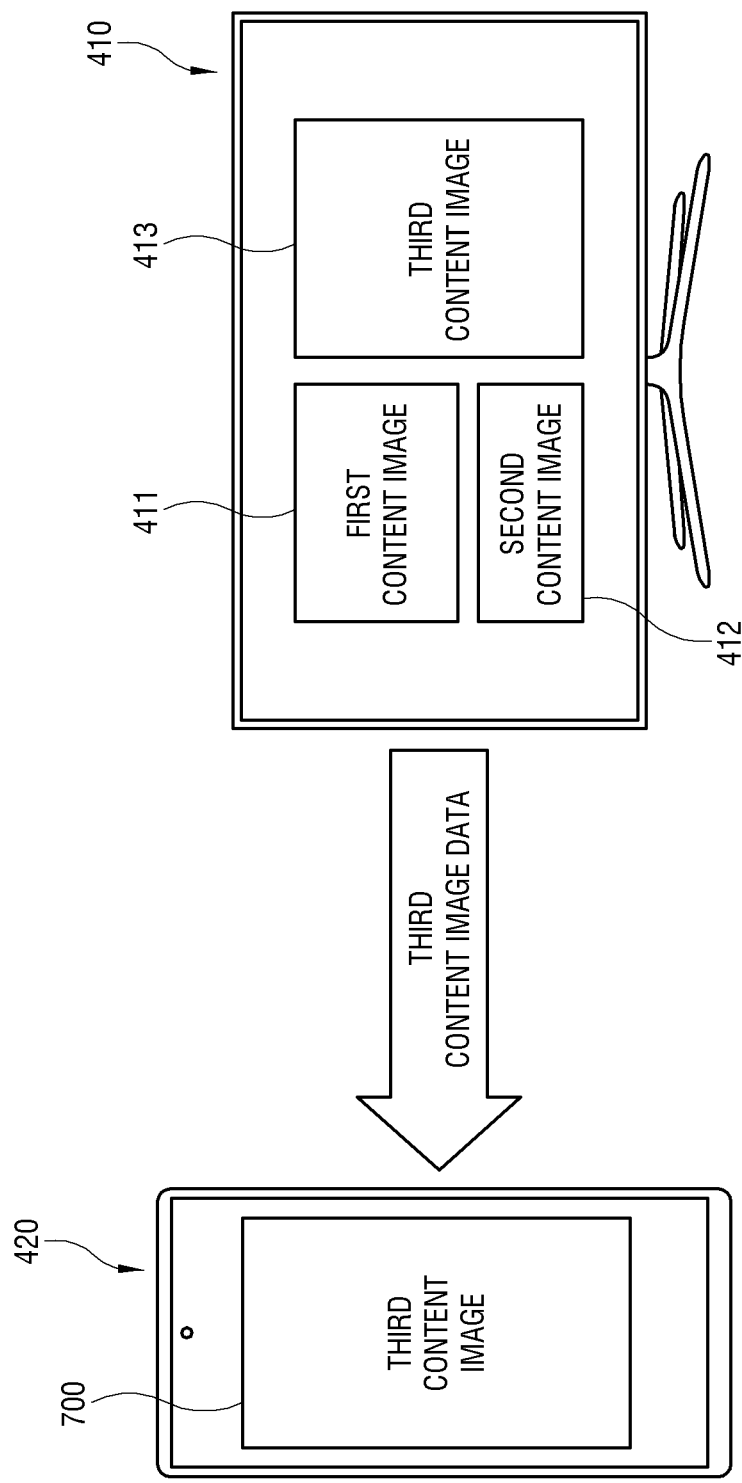
FIG. 7 is an exemplary diagram illustrating a case where the first display apparatus provides image data of selected content to the second display apparatus according to an embodiment.

FIG. 7 is an exemplary diagram illustrating a case where the first display apparatus provides image data of selected content to the second display apparatus according to an embodiment.

As illustrated in FIG. 7, when receiving the content selection information indicating selection of any one of the plurality of contents from the second display apparatus 420, the first display apparatus 410 transmits image data of the content indicated by the information to the second display apparatus 420. For example, it is assumed that the first display apparatus 410 displays the multi-view screen including the first content image 411, the second content image 412, and the third content image 413, and the third contents of the third content image 413 among the first, second, and third content images 411, 412, and 413 is selected by the user of the second display apparatus 420.

Therefore, the first display apparatus 410 transmits the image data of the third content to the second display apparatus 420. The second display apparatus 420 processes the image data received from the first display apparatus 410 and displays a third content image 700 on the screen.

As a result of the operation, the screen displayed on the first display apparatus 410 appears different from the screen displayed on the second display apparatus 420. The first display apparatus 410 displays the multi-view screen including the first content image 411 of the first content, the second content image 412 of the second content, and the third content image 413 of the third content, whereas the second display apparatus 420 displays the single view screen including the third content image 700 of the third content. In this way, the second display apparatus 420 does not display the same screen as the display screen of the first display apparatus 410, but may display only the specific content image, e.g., the third content image, 700 selected by the user.

For example, while the first, second, and third content images 411, 412, and 413 displayed on the first display apparatus 410, e.g., a TV, are displayed, the user may want to separately watch only third content image 413 on the second display apparatus 420, e.g., a mobile device. The first display apparatus 410, e.g., a TV, according to an embodiment provides the second display apparatus 420, e.g., a mobile device with the image data of the third content image 413 selected by the user, not image data of the entire screen being displayed. Accordingly, the user may view only the third content image 700 of the content desired by the user on the second display apparatus 420, e.g., a mobile device.

The first display apparatus 410 may transmit the image data of the content to the second display apparatus 420 based on various types of protocols. For example, the first display apparatus 410 decodes and buffers the image data of each of the first content, the second content, and the third content, and mixes each of the buffered image data and displays the mixed image data on the screen of the first display apparatus 410. The first display apparatus 410 may transmit the image data of the third content image 413 that is being buffered to the second display apparatus 420.

Alternatively, the first display apparatus 410 may transmit image data of undecoded content to the second display apparatus 420. The method is referred to as a cast method.

In the case of the cast method, the third content image 413 displayed on the first display apparatus 410 and the third content image 700 displayed on the second display apparatus 420 are based on the image data of the same content, but the image processing including decoding performed on the image data of the content is independently performed on each first and second display apparatus 410 and 420.

Alternatively, the first display apparatus 410 does not provide the image data of the content to the second display apparatus 420, and may provide address information (for example, URL information of the server in which the image data is stored) of the image data capable of acquiring the image data to the second display apparatus 420. The second display apparatus 420 accesses the provided address information and receives the image data from the server.

As described above, the first display apparatus 410 may provide the image data of the selected content to the second display apparatus 420 through various methods.

Figure 8:
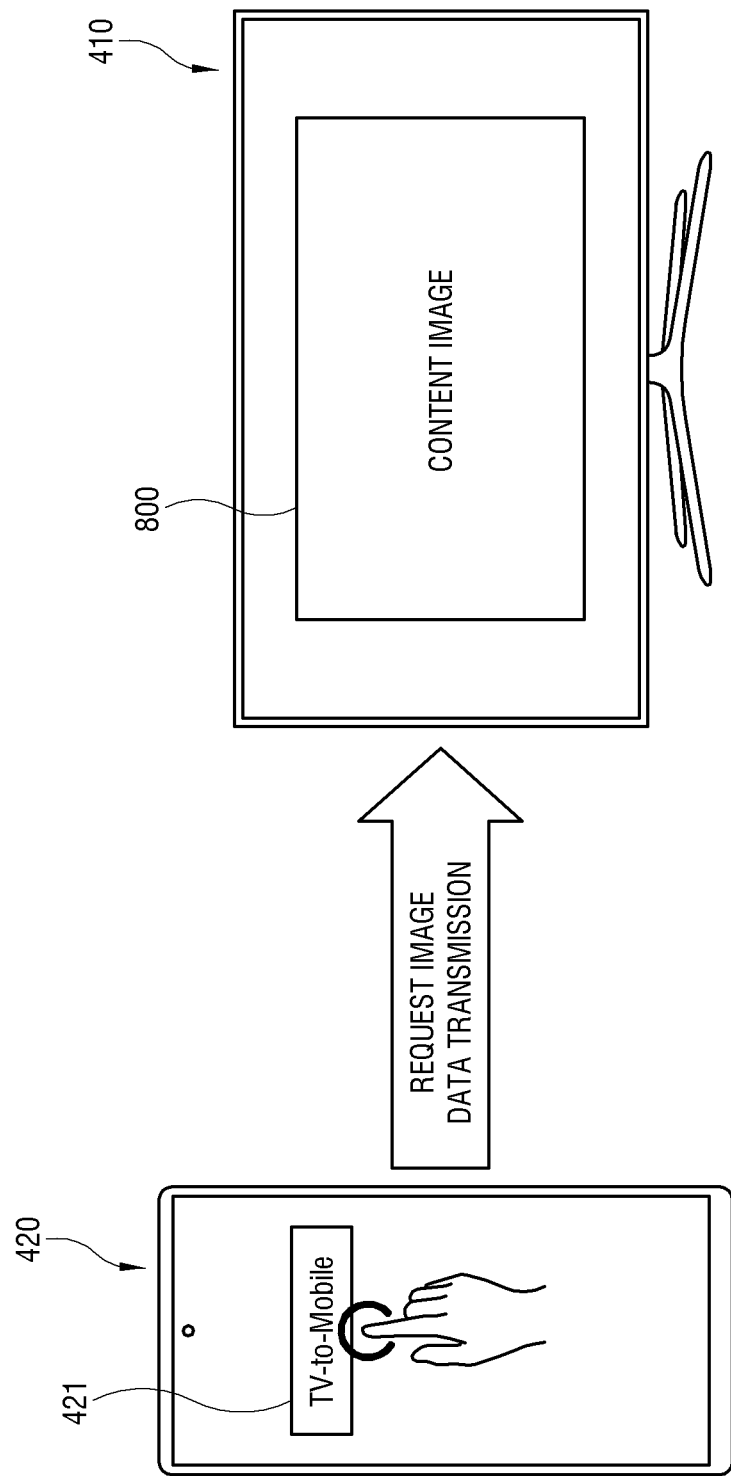
FIG. 8 is an exemplary diagram illustrating a case where the UI button is clicked on the second display apparatus while the first display apparatus displays a single view screen according to an embodiment.

FIG. 8 is an exemplary diagram illustrating a case where the UI button is clicked on the second display apparatus while the first display apparatus displays a single view screen.

As illustrated in FIG. 8, while a first display apparatus 410 and a second display apparatus 420 are connected to each other so as to communicate with each other, the first display apparatus 410 may display a single content image 800 based on the single content on the screen. That is, in an embodiment, the first display apparatus 410 displays the single view screen.

The second display apparatus 420 transmits the transmission request for the image data to the first display apparatus 410 according to a user input. For example, when detecting that the user touches the previously displayed UI button 421, the second display apparatus 420 transmits the transmission request to the first display apparatus 410.

When receiving the transmission request for the image data from the second display apparatus 420, the first display apparatus 410 identifies a current display state of the screen of the first display apparatus 410.

Figure 9:
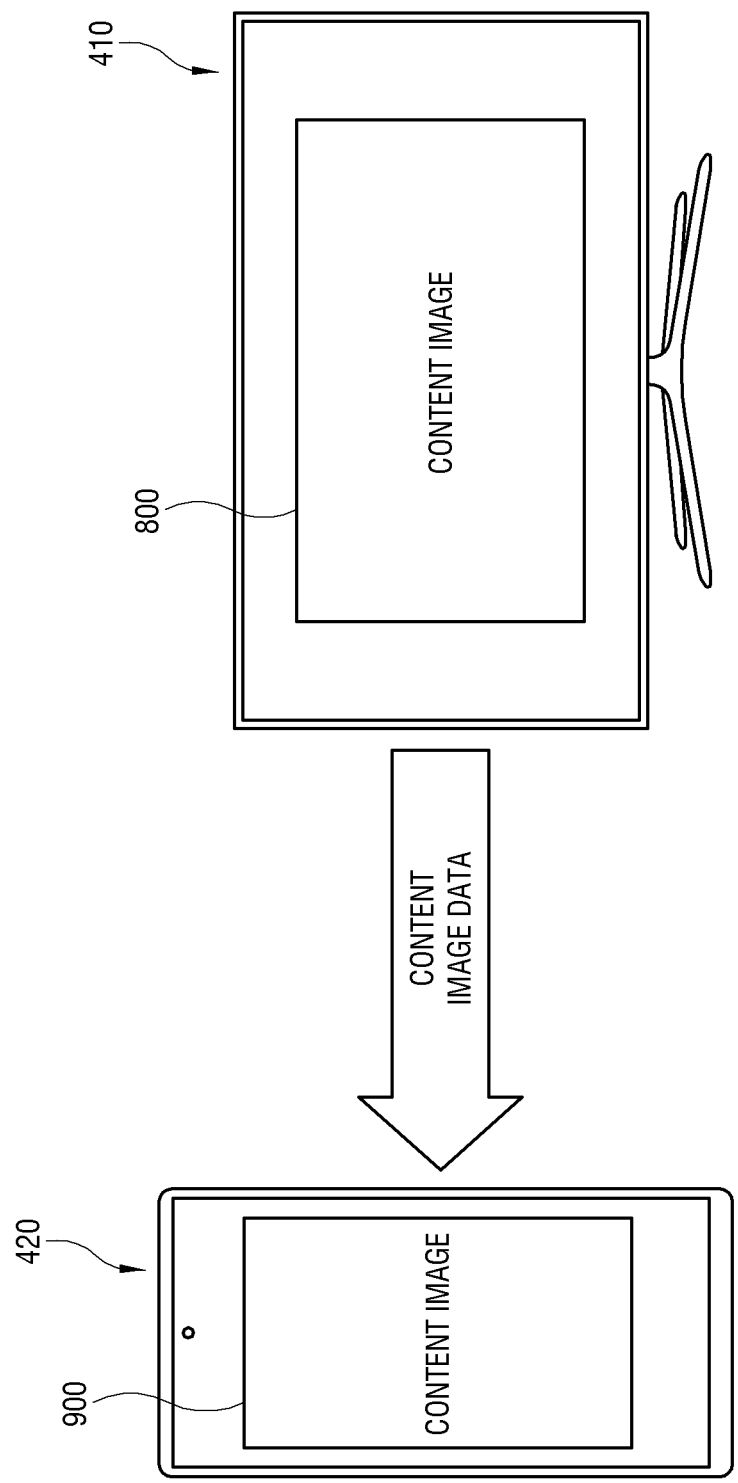
FIG. 9 is an exemplary diagram illustrating a case where the first display apparatus provides the image data in response to a request received while displaying the single view screen according to an embodiment.

FIG. 9 is an exemplary diagram illustrating a case where the first display apparatus provides the image data in response to a request received while displaying the single view screen according to an embodiment.

As illustrated in FIG. 9, the first display apparatus 410 identifies a current display state of the screen of the first display apparatus 410 in response to the transmission request for the image data received from the second display apparatus 420. Since the first display apparatus 410 displays a single view screen including a single content image 800, the selection of the content is not needed. The first display apparatus 410 identifies the content of the content image 800 that is currently being displayed, and transmits image data of the identified content to the second display apparatus 420.

The first display apparatus 410 may transmit image data based on various transmission protocols. For example, the first display apparatus 410 may transmit decoded image data, transmit undecoded image data, or transmit address information for acquiring the image data to the second display apparatus 420. This is described above, and therefore, a detailed description thereof will be omitted.

The second display apparatus 420 processes the image data received from the first display apparatus 410 to display a content image 900. The content image 900 is based on the same content as the content image 800 displayed on the first display apparatus 410.

Figure 10:
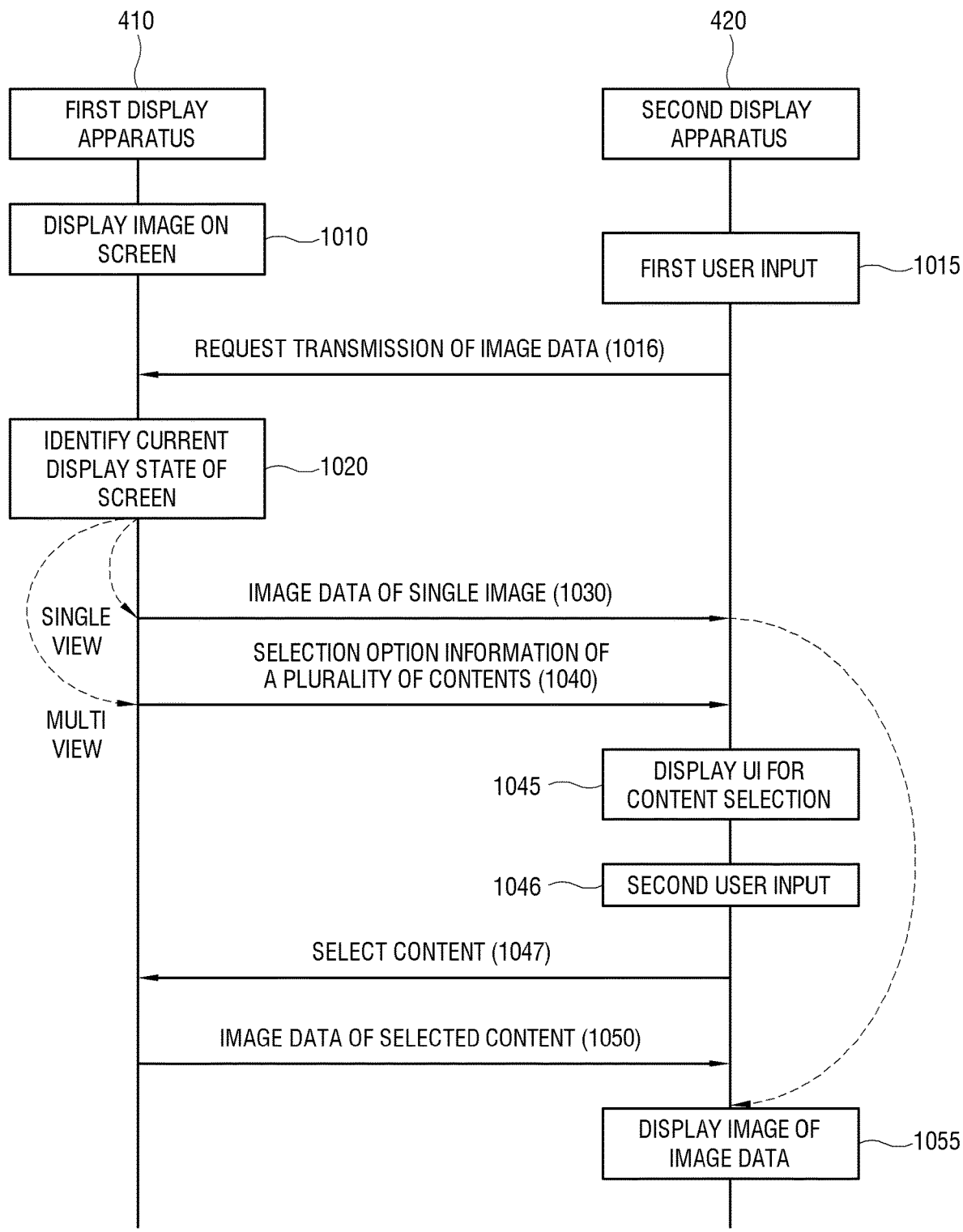
FIG. 10 is an exemplary diagram illustrating a sequence of operations performed between the first display apparatus and the second display apparatus according to an embodiment.

FIG. 10 is an exemplary diagram illustrating a sequence of operations performed between the first display apparatus and the second display apparatus according to an embodiment.

As illustrated in FIG. 10, the following operations are performed by a first processor of a first display apparatus 410 or a second processor of a second display apparatus 420, respectively.

In operation 1010, the first display apparatus 410 displays an image on the screen. This screen indicates a state of either a multi view screen or a single view screen.

In operation 1015, the second display apparatus 420 receives a first user input.

In operation 1016, the second display apparatus 420 transmits a transmission request for image data to the first display device according to the first user input.

In operation 1020, the first display apparatus 410 identifies a current display state of the screen of the first display apparatus 410 in response to the transmission request from the second display apparatus 420. For example, the first display apparatus 410 identifies whether the state of the current display screen is the multi view or the single view.

If the screen state is the single view, in operation 1030, the first display apparatus 410 transmits image data of a single image currently being displayed to the second display apparatus 420. Thereafter, the second display apparatus 420 proceeds to operation 1055.

If the screen state is the multi-view, in operation 1040, the first display apparatus 410 transmits information on a selection operation of a plurality of contents of a plurality of images currently being displayed to the second display apparatus 420.

In operation 1045, the second display apparatus 420 displays a UI for selecting a plurality of contents based on the information received from the first display apparatus 410.

In operation 1046, the second display apparatus 420 receives a second user input for selecting any one of the contents through the UI.

In operation 1047, the second display apparatus 420 transmits the content selection information according to the second user input to the first display apparatus 410.

In operation 1050, the first display apparatus 410 transmits the image data of the content indicated by the selection information received from the second display apparatus 420 to the second display apparatus 420.

In operation 1055, the second display apparatus 420 processes the image data received from the first display apparatus 410 to display an image.

On the other hand, the above-described embodiment has described the case where the first display apparatus 410 provides the image data according to the first user input (for example, when the user touches the UI button 421 in FIG. 4) generated in the second display apparatus 420. However, the first user input may be generated in the first display apparatus 410.

Figure 11:
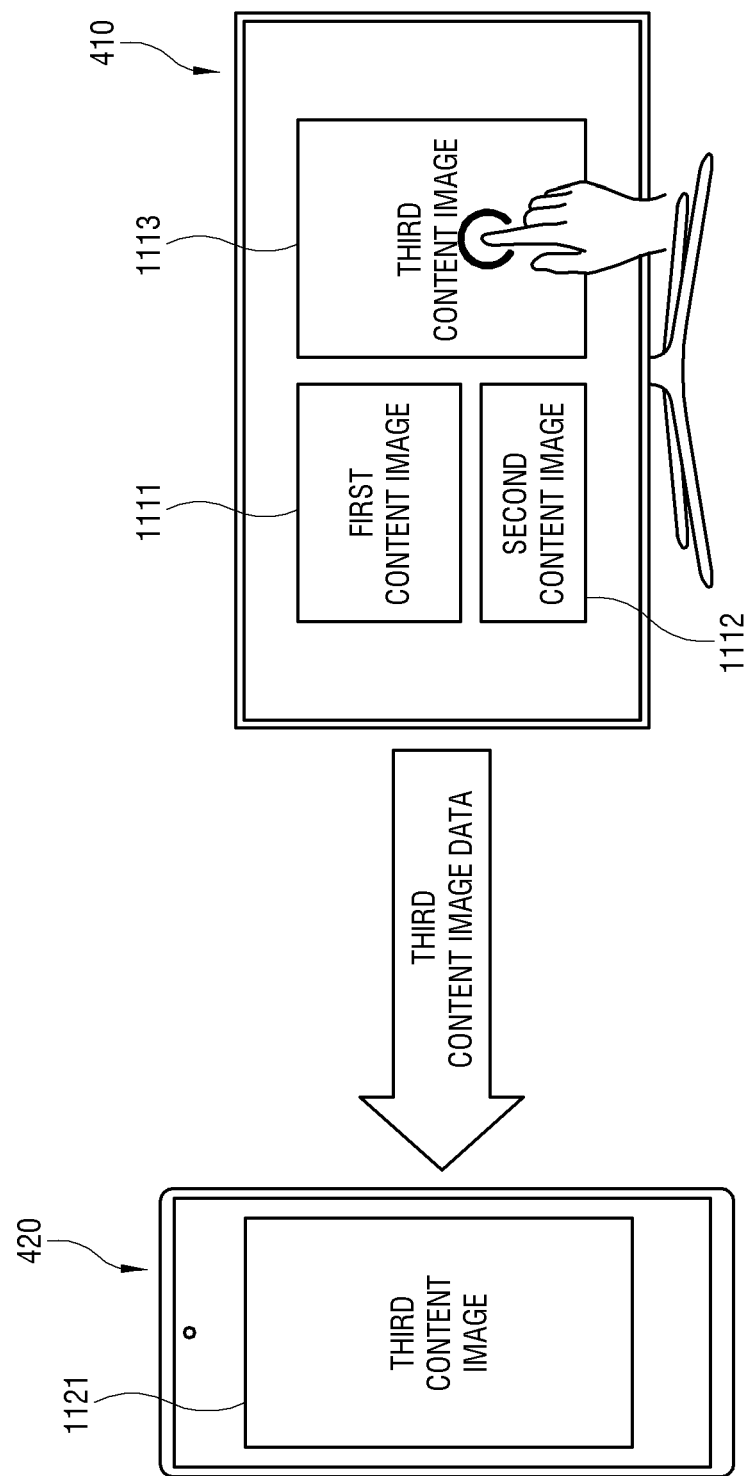
FIG. 11 is an exemplary diagram illustrating an operation of a case where a user selects the content image on a screen in the first display apparatus according to an embodiment.

FIG. 11 is an exemplary diagram illustrating an operation of a case where a user selects the content image on a screen in the first display apparatus according to an embodiment.

As illustrated in FIG. 11, a first display apparatus 410 and a second display apparatus 420 are communicatively connected to each other. The first display apparatus 410 displays a multi-view screen including a first content image 1111, a second content image 1112, and a third content image 1113.

In this state, the user may select any one content image among the first, second and third content images 1111, 1112, and 1113 displayed on the screen of the first display apparatus 410. A method for a user to select any one content image is not limited. Accordingly, when the first display apparatus 410 includes a touch screen structure, a method for a user to directly touch a third content image 1113 on a screen is possible, or a user may manipulate a remote controller provided in the first display apparatus 410 to select the third content image 1113.

When the third content image 1113 is selected, the first display apparatus 410 identifies the content of the third content image 1113 and transmits image data of the identified content to the second display apparatus 420. For example, when the third content image 1113 is selected, the first display apparatus 410 identifies third content of the third content image 1113 and transmits image data of the third content to the second display apparatus 420.

When the third content is identified, the first display apparatus 410 may additionally display a UI requesting an instruction of the next operation for the third content. For example, when the user touches the third content image 1113, the first display apparatus 410 displays a UI including a processing option for the third content on the screen. When receiving a user input instructing to provide the third content to the second display apparatus 420 through the UI, the first display apparatus 410 transmits image data of the third content to the second display apparatus 420.

The second display apparatus 420 processes the image data received from the first display apparatus 410 to display a content image 1121 on the screen. In this process, the second display apparatus 420 additionally displays a UI requesting an instruction of whether to receive image data. The second display apparatus 420 receives the image data from the first display apparatus 410 when receiving a user input instructing reception permission through the UI.

In this way, when a third content image 1113 is selected by the first display apparatus 410, the first display apparatus 410 may transmit the image data of the corresponding content to the second display apparatus 420 according to the selected result.

As described above, the first display apparatus may allow different content images to be simultaneously displayed on a plurality of second display apparatuses.

Figure 12:
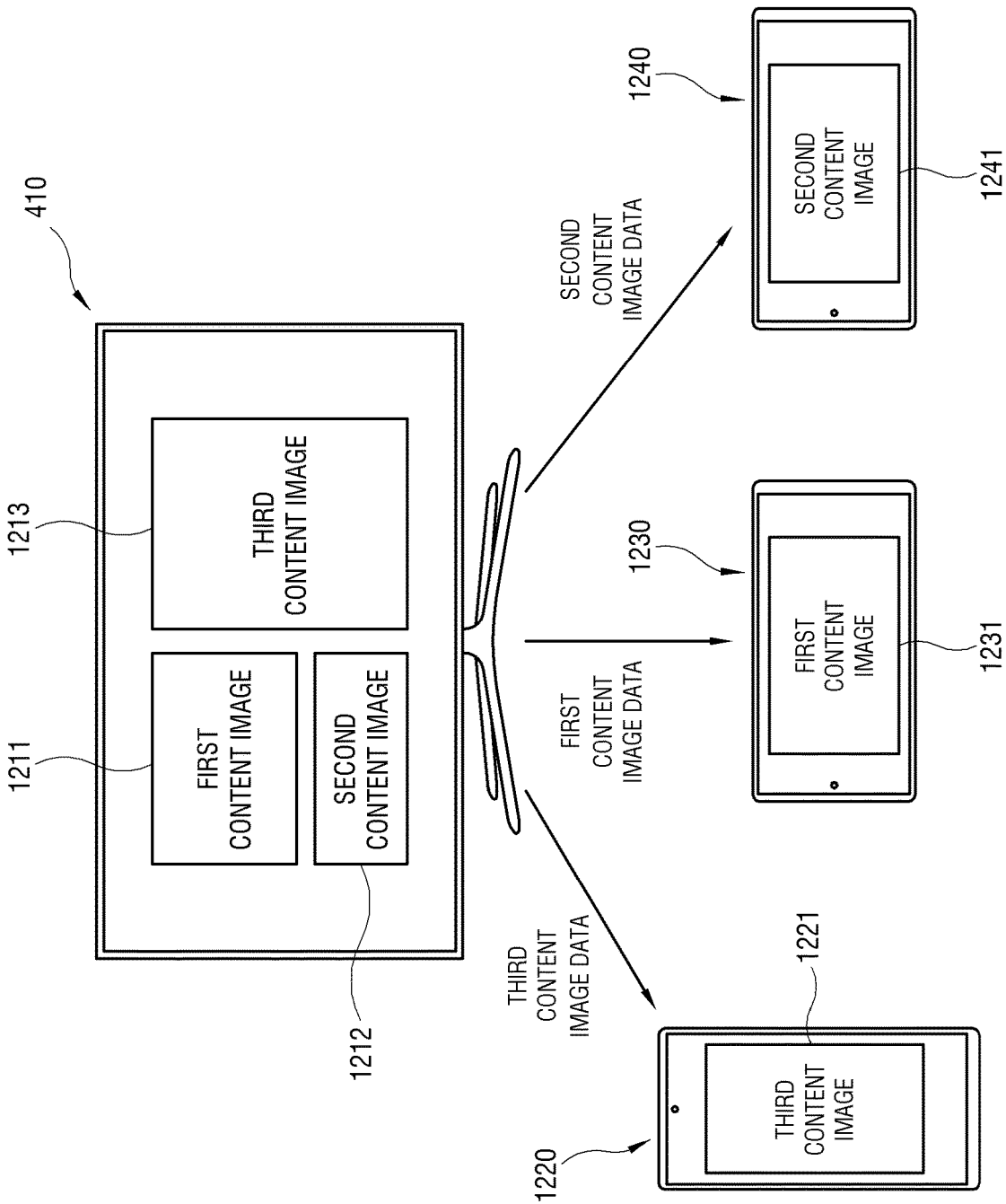
FIG. 12 is an exemplary diagram illustrating a case where the first display apparatus provides different image data to a plurality of external apparatuses according to an embodiment.

FIG. 12 is an exemplary diagram illustrating a case where the first display apparatus provides different image data to a plurality of external apparatuses according to an embodiment.

As illustrated in FIG. 12, the first display apparatus 410 communicates with a plurality of second display apparatuses 420, e.g., a plurality of external apparatuses including, for example, the first external apparatus 1220, the second external apparatus 1230, and the third external apparatus 1240. Each of the first external apparatus 1220, the second external apparatus 1230, and the third external apparatus 1240 may individually transmit the transmission request for the image data to the first display apparatus 410. The first display apparatus 410 operates in response to each received transmission request. The operation of the first display apparatus 410 is described above, and therefore, a further description thereof will be omitted.

For example, while the first display apparatus 410 displays the multi-view screen including the first content image 1211, the second content image 1212, and the third content image 1213, each of the cases where the first external apparatus 1220 selects third content of the third content image 1213, the second external apparatus 1230 selects first content of the first content image 1211, and the third external apparatus 1240 selects second content of the second content image 1212 is considered.

The first display apparatus 410 transmits the image data of the third content to the first external apparatus 1220, the image data of the first content to the second external apparatus 1230, and the image data of the second content to the third external apparatus 1240 in response to each selection.

Accordingly, the first external apparatus 1220 may display the third content image 1221, the second external apparatus 1230 may display the first content image 1231, and the third external apparatus 1240 may display the second content image 1241, respectively. As a result, the first external apparatus 1220, the second external apparatus 1230, and the third external apparatus 1240 may separately display the first content image 1211, the second content image 1212, and the third content image 1213 each displayed on the first display apparatus 410.

Meanwhile, while the mirrored screen is provided from the first display apparatus to the second display apparatus, a situation in which a specific content image in the mirrored screen is selected by the second display apparatus is also possible as described below.

Figure 13:
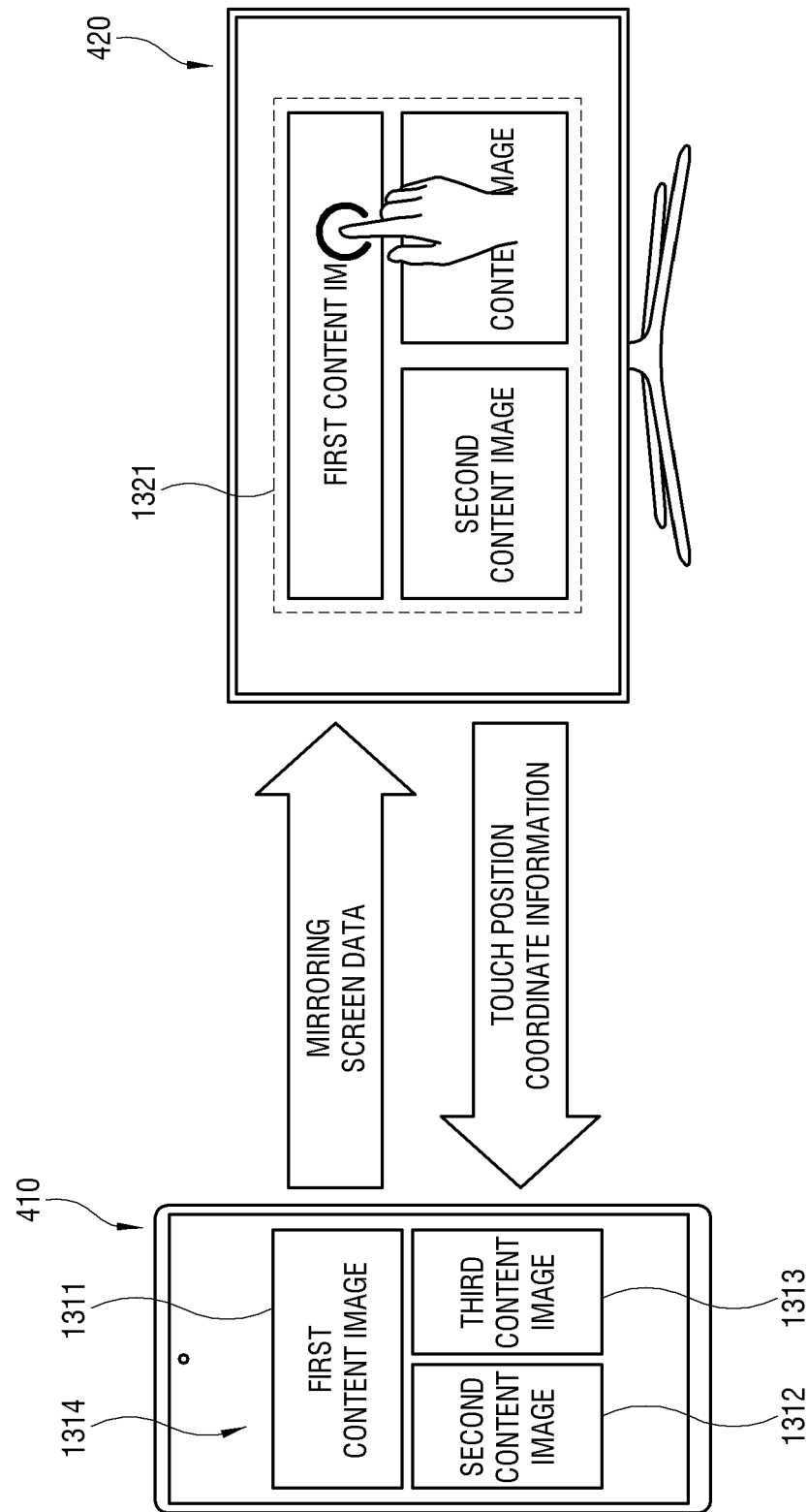
FIG. 13 is an exemplary view illustrating a state in which the first display apparatus provides a mirrored screen to the second display apparatus according to an embodiment.

FIG. 13 is an exemplary view illustrating a state in which the first display apparatus provides a mirrored screen to the second display apparatus according to an embodiment.

As illustrated in FIG. 13, while the first display apparatus 410 displays the multi-view screen, the first display apparatus 410 provides data of a multi-view screen 1314 to the second display apparatus 420, so the same mirrored screen 1321 as the multi-view screen 1314 of the first display apparatus 410 may be displayed on the second display apparatus 420. As an example, a case where the first display apparatus 410 is a mobile device and the second display apparatus 420 is a TV will be described. However, as described above, the first display apparatus 410 and the second display apparatus 420 are not limited to a specific type of devices.

While the first display apparatus 410 displays the multi-view screen 1314 including, for example, a first content image 1311, a second content image 1312, and a third content image 1313, the data of the multi-view screen 1314 is transmitted to the second display apparatus 420 in response to a user input at the first display apparatus 410 or a mirroring request from the second display apparatus 420. The first display apparatus 410 generates a multi-view screen 1314 by decoding image data of each content and mixing the decoded image data. The first display apparatus 410 transmits data of the multi-view screen 1314 being buffered for display to the second display apparatus 420.

The second display apparatus 420 processes the data received from the first display apparatus 410 to display the mirrored screen 1321. That is, the second display apparatus 420 only displays data from the first display apparatus 410 on the mirrored screen 1321 without decoding each content. Therefore, like the multi-view screen 1314, the mirrored screen 1321 is visually visible to the user.

The second display apparatus 420 has a display capable of detecting a touch input. Under such an environment, a case is considered where a user touches an area corresponding to the first content image on the mirrored screen 1321 of the second display apparatus 420. As described above, the mirrored screen 1321 is displayed by the second display apparatus 420, but is a screen decoded and mixed by the first display apparatus 410. Accordingly, even if the user of the mirrored screen 1321 touches a specific position, the second display apparatus 420 does not know whether the user touches the position where the first content image is displayed.

Accordingly, when a user's touch is detected, the second display apparatus 420 transmits information on coordinates of the position where the touch is performed on the screen to the first display apparatus 410. This information indicates coordinates at which a user's touch input is performed on the entire screen of the second display apparatus 420. For example, the information includes horizontal and vertical pixel values of the entire screen, and among them, horizontal and vertical pixel values on which a touch is performed. Alternatively, when the total horizontal length and the total vertical length of the entire screen each are 100%, the coordinates of the position where the touch is performed may be indicated by a percentage in the total horizontal length and the total vertical length, respectively.

Hereinafter, the operation of the first display apparatus 410 when the touch position coordinate information is received from the second display apparatus 420 will be described.

Figure 14:
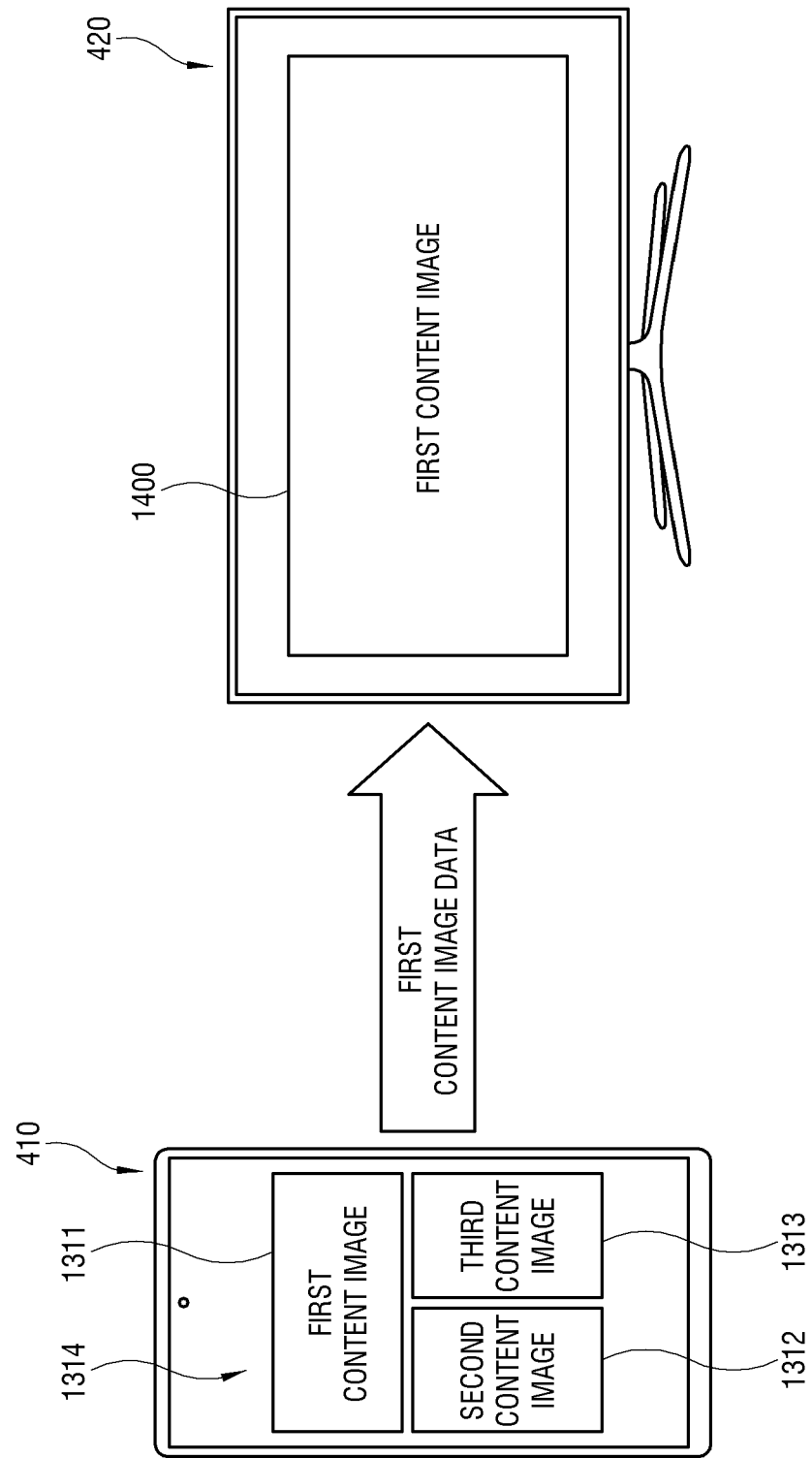
FIG. 14 is an exemplary diagram illustrating an operation of a case where the first display apparatus receives touch position coordinate information from the second display apparatus according to an embodiment.

FIG. 14 is an exemplary diagram illustrating an operation of a case where the first display apparatus receives touch position coordinate information from the second display apparatus according to an embodiment.

As illustrated in FIG. 14, the first display apparatus 410 generates a touch input from the second display apparatus 420 from the touch position coordinate information received from the second display apparatus 420, identifies whether the touch is made at any position on the screen, and performs the following operations according to the identification result.

The first display apparatus 410 identifies positions corresponding to the coordinates indicated by the touch position coordinate information on the multi-view screen 1314, and identifies the first content image 1311 corresponding to the identified position among the first, second, and third content images 1311, 1312, 1313 displayed on the multi-view screen 1314.

For example, when the first content image 1311 is identified, the first display apparatus 410 identifies the first content of the first content image 1311 and transmits the image data of the first content to the second display apparatus 420. At this time, the first display apparatus 410 continues to display the multi-view screen 1314. The first display apparatus 410 may transmit decoded image data of the first content or may transmit an undecoded file of the first content.

The second display apparatus 420 displays a first content image 1400 based on the image data of the first content received from the first display apparatus 410. As such, while the first display apparatus 410 displays the multi-view screen 1314, the second display apparatus 420 may select and display the first content image 1311 among the first, second, and third content images 1311, 1312, and 1313 in the multi-view screen 1314.

Figure 15:
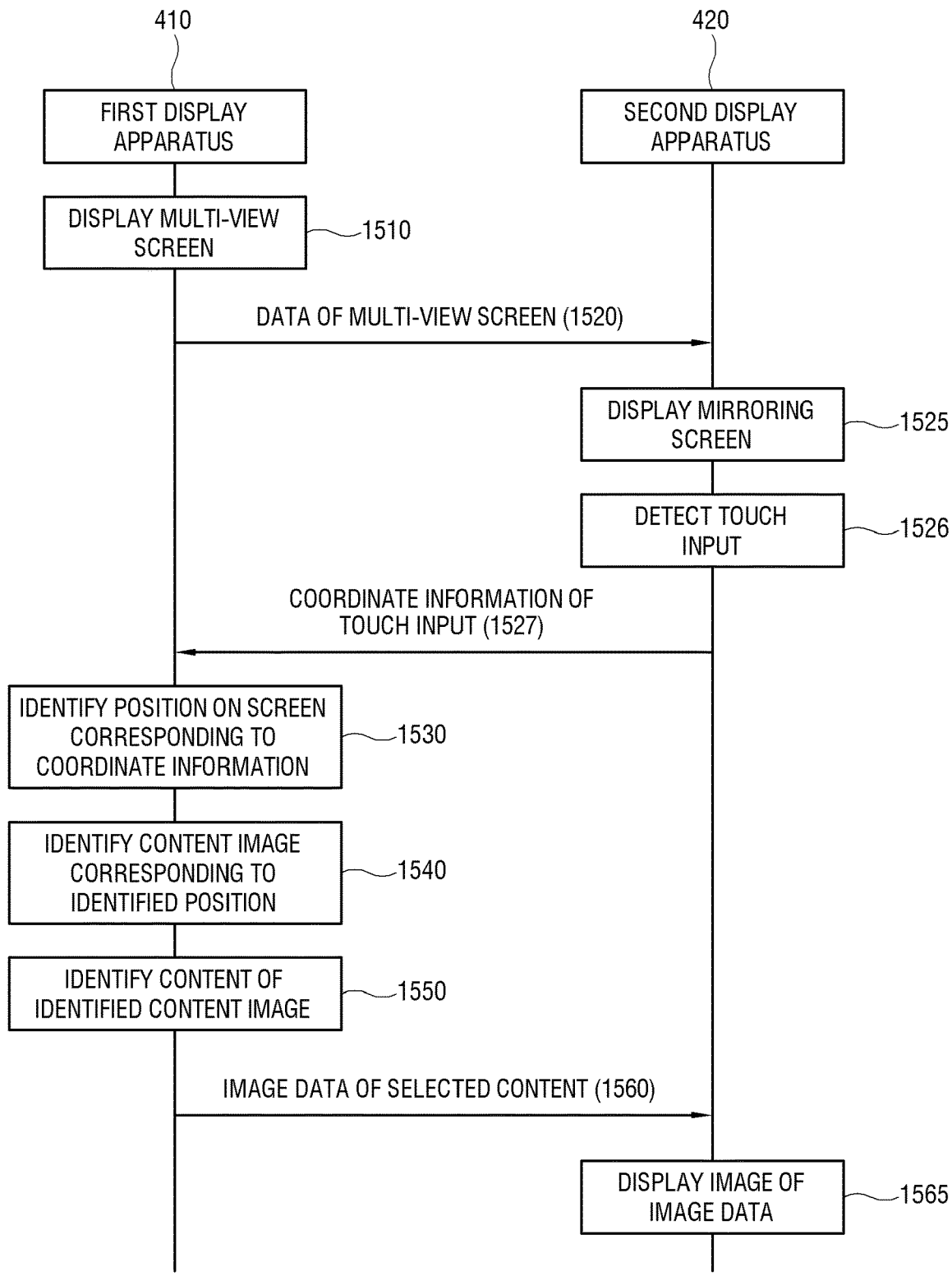
FIG. 15 is an exemplary diagram illustrating a sequence of operations performed between the first display apparatus and the second display apparatus according to an embodiment.

FIG. 15 is an exemplary diagram illustrating a sequence of operations performed between the first display apparatus and the second display apparatus according to an embodiment.

As illustrated in FIG. 15, the following operations are performed by a first processor of a first display apparatus 410 or a second processor of a second display apparatus 420, respectively.

In operation 1510, the first display apparatus 410 displays a multi-view screen including a plurality of content images.

In operation 1520, the first display apparatus 410 transmits the data of the multi-view screen to the second display apparatus 420.

In operation 1525, the second display apparatus 420 displays the mirrored screen of the multi-view screen based on the data of the multi-view screen received from the first display apparatus 410.

In operation 1526, the second display apparatus 420 detects a user's touch input performed on the mirrored screen.

In operation 1527, the second display apparatus 420 transmits coordinate information indicating a position on the screen where the touch input is performed to the first display apparatus 410.

In operation 1530, the first display apparatus 410 identifies the position on the screen corresponding to the coordinate information from the first display apparatus 410.

In operation 1540, the first display apparatus 410 identifies a content image corresponding to the identified position among a plurality of content images.

In operation 1550, the first display apparatus 410 identifies the content of the identified content image.

In operation 1560, the first display apparatus 410 transmits the image data of the identified content to the second display apparatus 420.

In operation 1565, the second display apparatus 420 displays the content image based on the image data received from the first display apparatus 410.

As described above, the first display apparatus displays a multi-view screen including a plurality of content images and the second display apparatus displays any one of a plurality of content images. However, when the first display apparatus displays a single content image, the second display apparatus may be configured to select and display only a specific area within the corresponding content image as described below.

Figure 16:
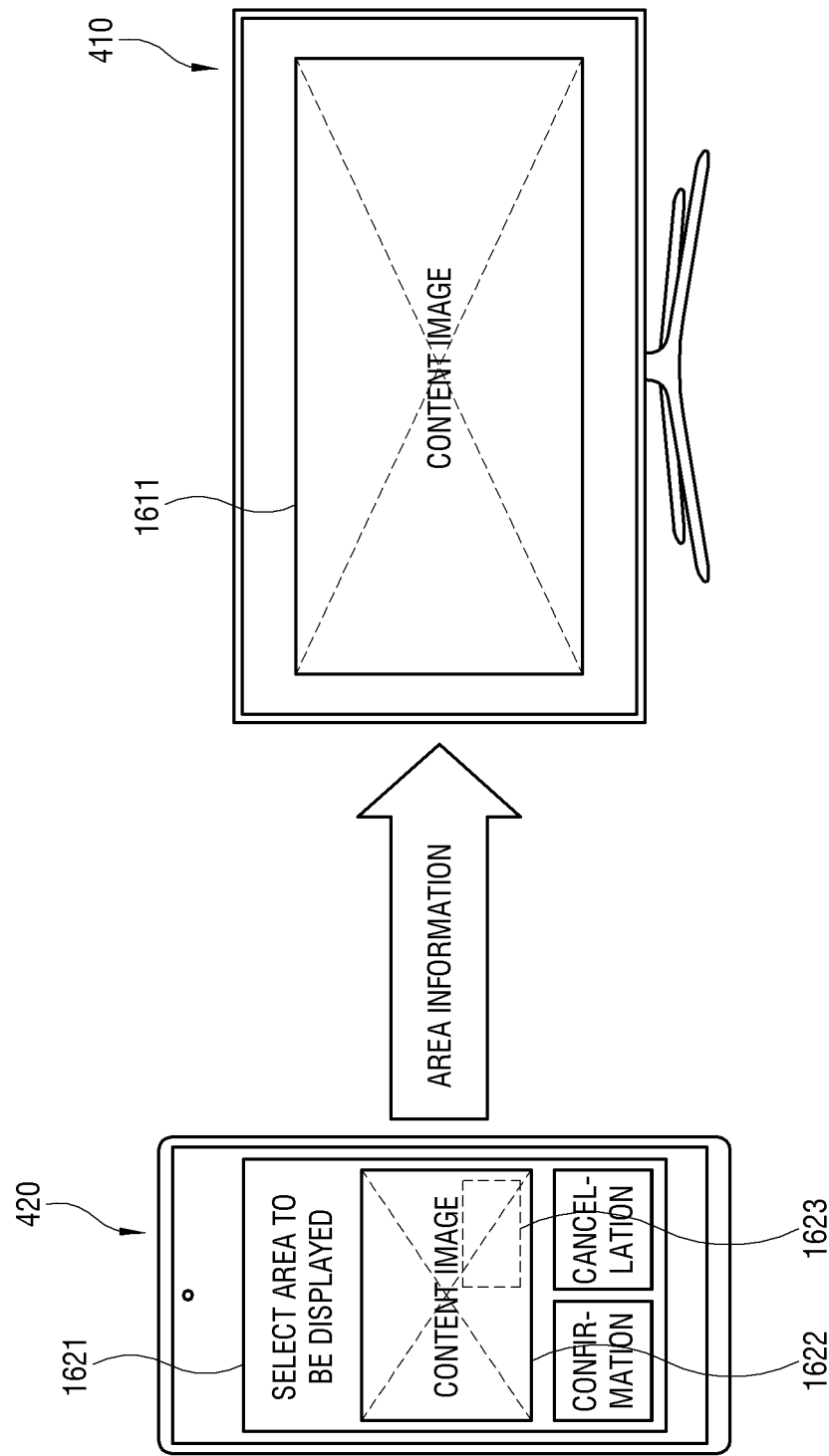
FIG. 16 is an exemplary diagram illustrating a case where the second display apparatus displays the UI provided to select a partial area of the content image displayed on the first display apparatus according to an embodiment.

FIG. 16 is an exemplary diagram illustrating a case where the second display apparatus displays the UI provided to select a partial area of the content image displayed on the first display apparatus according to an embodiment.

As illustrated in FIG. 16, a first display apparatus 410 communicates with a second display apparatus 420 and displays a content image 1611 on the screen. The first display apparatus 410 provides the second display apparatus 420 with a UI 1621 provided to select a partial area of the content image 1611 being displayed, so the second display apparatus 420 displays the UI 1621.

The UI 1621 may be generated by the first display apparatus 410 according to the user input from the first display apparatus 410 and provided to the second display apparatus 420, or may be provided from the first display apparatus 410 to the second display apparatus 420 in response to the request of the second display apparatus 420. Alternatively, when the first display apparatus 410 provides image information on the content image to the second display apparatus 420, the second display apparatus 420 may generate the UI 1621 based on the image information.

The UI 1621 is provided so that a user may designate an area to be displayed on the screen of the second display apparatus 420 in the entire area of the content image 1611. The implementation method of the UI 1621 is not limited, and the UI 1621 may include, for example, an entire area 1622 corresponding to the entire content image 1611 and a frame 1623 provided to select an area of a size and position within the entire area 1622. The frame 1623 may be moved within the entire area 1622, and a size thereof is provided to be variable, so the user may designate an area of a desired size and position within the entire area 1622.

When an area is designated by the user through the UI 1621, the second display apparatus 420 transmits area information on the size and position of the designated area within the entire area 1622 to the first display apparatus 410.

Hereinafter, an operation of the first display apparatus 410 responding to the area information from the second display apparatus 420 will be described.

Figure 17:
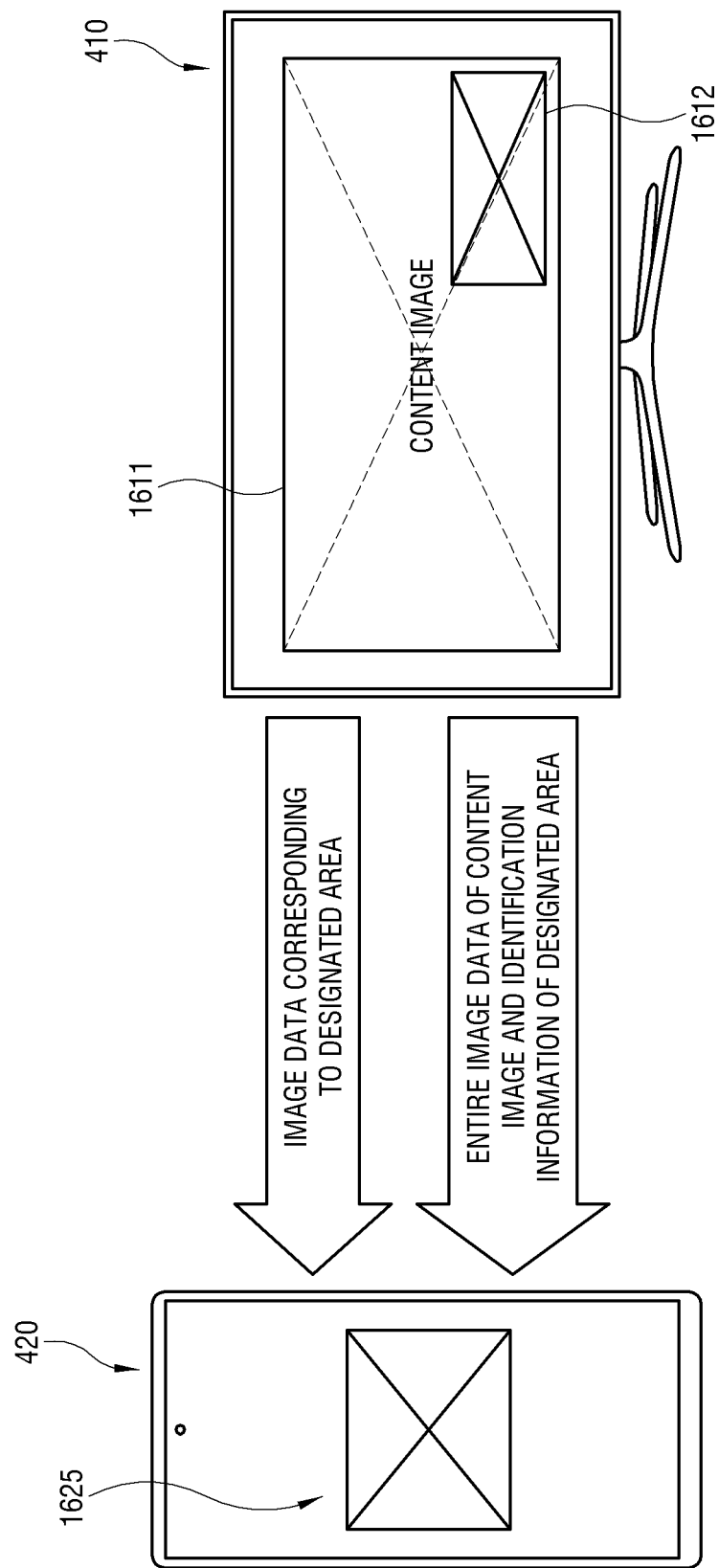
FIG. 17 is an exemplary diagram illustrating a method of providing, by a first display apparatus, image data in response to area information from a second display apparatus according to an embodiment.

FIG. 17 is an exemplary diagram illustrating a method of providing, by a first display apparatus, image data in response to area information from a second display apparatus according to an embodiment.

As illustrated in FIG. 17, the first display apparatus 410 identifies a designated area 1612, e.g., a partial area, in the content image 1611 corresponding to the area information received from the second display apparatus 420. As described above, since the area information includes information on an area corresponding to a designated size and position within the entire area corresponding to the content image 1611, the first display apparatus 410 may identify the designated area 1612 corresponding to the area information.

The first display apparatus 410 causes an image 1625 corresponding to the identified designated area 1612 to be displayed on the second display apparatus 420. For this, the operation of the first display apparatus 410 may be performed in various ways. As an example, the first display apparatus 410 selects image data corresponding to the designated area 1612 among image data processed for display of the content image 1611 and transmits the selected image data to the second display apparatus 420. The second display apparatus 420 processes the image data received from the first display apparatus 410 as is without separate analysis to display an image.

As another example, the first display apparatus 410 transmits both of the entire image data of the content image 1611 and the identification information for identifying the designated area 1612 within the content image 1611 to the second display apparatus 420. The second display apparatus 420 identifies image data corresponding to the identification information of the designated area 1612 among the received image data, and displays an image 1625 of the identified image data.

In this way, when the first display apparatus 410 displays the single content image 1611, the second display apparatus 420 may display the image 1625 corresponding to the designated area 1612 of the content image 1611.

As described above, a configuration targets a content image displayed on a screen by the first display apparatus. However, even if the first display apparatus does not display an image on the screen, the first display apparatus may decode and buffer at least the image data. That is, not only the display state of the screen of the first display apparatus, but also the processing state of the image data of the first display apparatus may be considered as a target as described in detail below.

Figure 18:
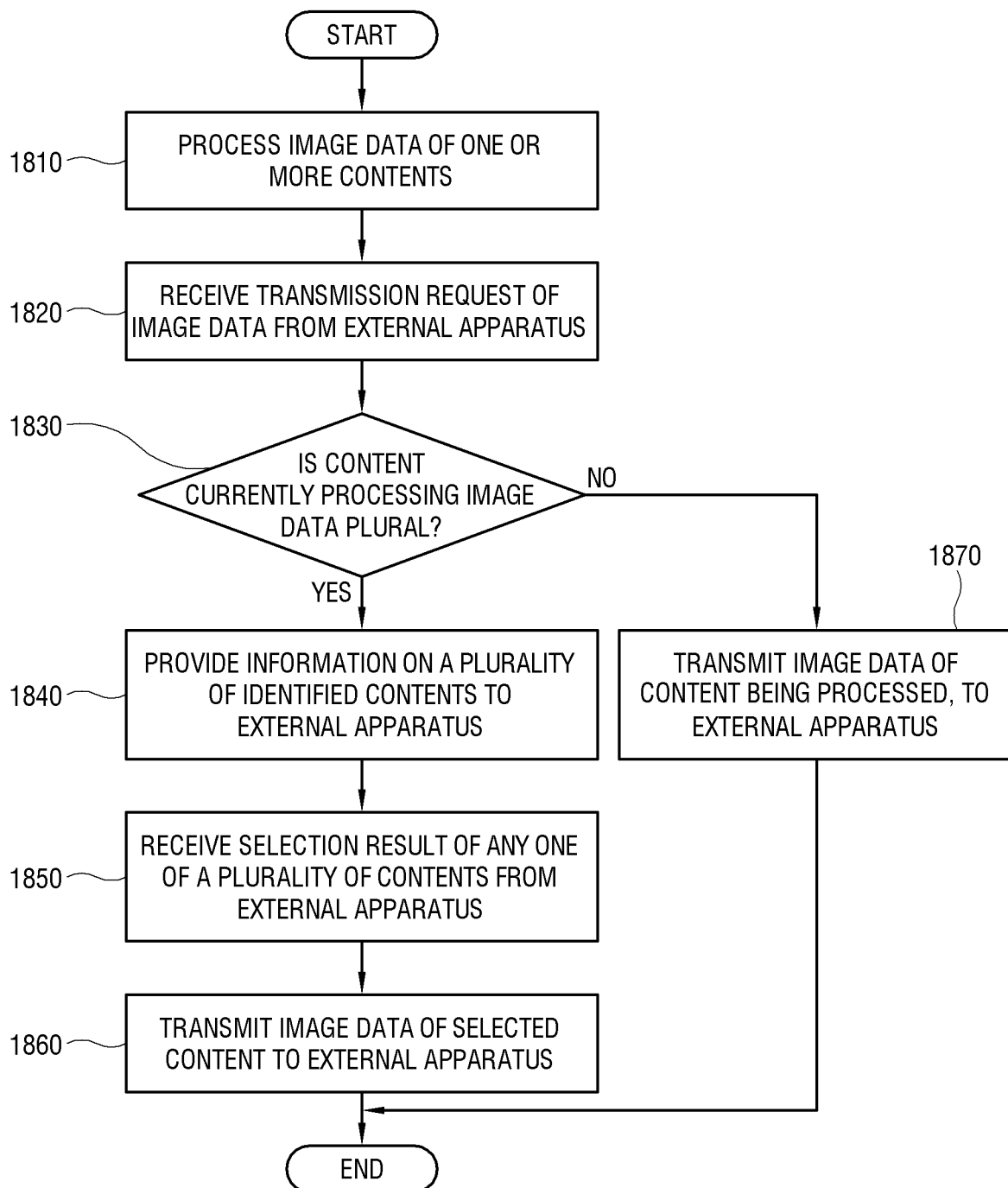
FIG. 18 is a flowchart illustrating a control method of a first display apparatus according to an embodiment.

FIG. 18 is a flowchart illustrating a control method performed by a first processor of a first display apparatus according to an embodiment.

In operation 1810, the first display apparatus processes image data of one or more contents. For example, the first display apparatus may decode and buffer image data of one or more contents, but may display or might not display an image.

In operation 1820, the first display apparatus receives a transmission request for image data from the external apparatus, that is, the second display apparatus.

In operation 1830, the first display apparatus identifies whether the number of content of image data currently processing is plural (that is, whether the selection of the content to be transmitted to the external apparatus is needed), in response to the transmission request.

When it is identified that the number of content of image data currently processing is plural, in operation 1840, the first display apparatus transmits the information on the plurality of identified contents to the external apparatus.

In operation 1850, the first display apparatus receives a result of selecting any one of a plurality of contents indicated by the information from the external apparatus. For example, the external apparatus displays a UI so that the user selects any one of a plurality of pieces of content information indicated by information received from the first display apparatus, and notifies the first display apparatus of identification information of the selected content through the UI.

In operation 1860, the first display apparatus transmits the image data of the content selected from the external apparatus to the external apparatus.

On the other hand, when it is identified that the number of content of image data currently processing is not plural, in operation 1870, the first display apparatus transmits the image data of the content being processed to the external apparatus.

In this way, the first display apparatus may cause the second display apparatus to display the image of content desired by a user of the second display apparatus among the contents currently being processed, thereby reducing processing times and increasing efficiency of the networks.

The operations of the apparatus according to embodiments may be performed by using artificial intelligence mounted in the apparatus. The artificial intelligence may be applied to various systems using machine learning algorithms. The artificial intelligence system is a computer system that implements intelligence corresponding to a human level or comparable to a human level, and is a system in which a machine, an apparatus, or a system autonomously performs learning and determination, and the recognition rate and determination accuracy are improved based on accumulation of use experience. The artificial intelligence technology includes machine learning technologies that use algorithms to classify/learn characteristics of input data, element technologies that simulate functions of recognition, determination, and the like of a human brain using machine learning algorithms, and the like.

Examples of the element technologies include at least one of, for example, linguistic understanding technology for recognizing human language and character, visual understanding technology for recognizing objects like human vision, reasoning and prediction technology for logically reasoning and predicting information by determining the information, knowledge expression technology for processing human experience information with knowledge data, or motion control technology for controlling autonomous driving of vehicles and movement of robots.

The linguistic understanding is a technology of recognizing and applying, and processing human languages/characters, and includes natural language processing, machine translation, a dialog system, question and answer, speech recognition/synthesis, and the like.

The inference/prediction is a technology of deciding and logically inferring and predicting information, and includes knowledge and probability-based inference, optimization prediction, preference-based planning, recommendation, and the like.

The knowledge representation is a technology of automating and processing human experience information as knowledge data, and includes knowledge establishment (data generation/classification), knowledge management (data utilization), and the like.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

The computer-readable recording medium may include a program command, a data file, a data structure or the like, alone or a combination thereof. For example, the computer-readable recording medium may include a non-volatile storage such as a USB memory device, memories such as a RAM, a ROM, a flash memory, a memory chip, and an integrated circuit, or storage media, such as a CD, a DVD, a magnetic disk, and a magnetic tape, that may be optically or magnetically written and at the same time, read by a machine (for example, a computer), regardless of whether data are erasable or rewritable. It may be appropriated that a memory that may be included in a mobile terminal is an example of a storage medium appropriate for storing a program or programs including instructions implementing embodiments and readable by a machine. The program instructions recorded in this storage medium may be specifically designed and constructed or may be available to those skilled in the art. Alternatively, the computer program instruction may be implemented by the computer program product.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. An electronic apparatus comprising:
    a display;
    a communication circuit configured to communicate with an external apparatus; and
    a processor configured to:
        transmit, to the external apparatus, a request to receive information on a screen which is currently displayed on the external apparatus,
        receive, from the external apparatus, a response corresponding to the request,
        based on the response, identify a number of contents displayed in the screen,
        based on identifying that a plurality of contents is displayed in the screen, display a user interface (UI) on the display for selecting one among the plurality of contents,
        in response to a content, among the plurality of contents, being selected by a user input through the UI, transmit a signal indicating the selected content to the external apparatus, and
        receive, from the external apparatus, data corresponding to the selected content to display an image on the display.

2. The electronic apparatus according to claim 1, wherein the UI includes a plurality of graphic objects respectively corresponding to the plurality of contents, the graphic objects arranged to correspond to a position and a size of content images of the plurality of contents in the screen.

3. The electronic apparatus according to claim 2, wherein the processor is configured to identify a graphic object of the plurality of graphic objects corresponding to a touch position by the user input on the UI, and select the content corresponding to the identified graphic object.

4. The electronic apparatus according to claim 1, wherein the selected content is a first content, and
    based on identifying that a single second content is displayed in the screen, the processor is configured to display an image on the display based on data corresponding to the second content.

5. The electronic apparatus according to claim 4, wherein the processor is configured to obtain the data corresponding to the second content included in the response.

6. The electronic apparatus according to claim 4, wherein the processor is configured to obtain address information included in the response, and obtain second content data stored in a server using the address information.

7. A control method of an electronic apparatus, the method comprising:
    transmitting, to an external apparatus, a request to receive information on a screen which is currently displayed on the external apparatus,
    receiving, from the external apparatus, a response corresponding to the request,
    based on the response, identifying a number of contents displayed in the screen,
    based on identifying that a plurality of contents is displayed in the screen, displaying a user interface (UI) for selecting one among the plurality of contents,
    in response to a content, among the plurality of contents, being selected by a user input through the UI, transmitting a signal indicating the selected content to the external apparatus, and
    receiving, from the external apparatus, data corresponding to the selected content to display an image.

8. The method according to claim 7, wherein the UI includes a plurality of graphic objects respectively corresponding to the plurality of contents, the graphic objects arranged to correspond to a position and a size of content images of the plurality of contents in the screen.

9. The method according to claim 8, wherein the transmitting the signal comprises:
    identifying a graphic object of the plurality of graphic objects corresponding to a touch position by the user input on the UI, and
    selecting the content corresponding to the identified graphic object.

10. The method according to claim 7, wherein the selected content is a first content, and
    wherein the method further comprises:
    based on identifying that a single second content is displayed in the screen, displaying an image based on data corresponding to the second content.

11. The method according to claim 10, wherein the displaying the image based on the data corresponding to the second content comprises:
    obtaining the data corresponding to the second content included in the response.

12. The method according to claim 10, wherein the displaying the image based on the data corresponding to the second content comprises:
- obtaining address information included in the response, and
- obtaining second content data stored in a server using the address information.

13. A non-transitory computer readable medium recording instructions for execution by a processor of an electronic apparatus to cause the electronic apparatus to perform a method, the method comprising:
- transmitting, to an external apparatus, a request to receive information on a screen which is currently displayed on the external apparatus,
- receiving, from the external apparatus, a response corresponding to the request,
- based on the response, identifying a number of contents displayed in the screen,
- based on identifying that a plurality of contents is displayed in the screen, displaying a user interface (UI) for selecting one among the plurality of contents,
- in response to a content, among the plurality of contents, being selected by a user input through the UI, transmitting a signal indicating the selected content to the external apparatus, and
- receiving, from the external apparatus, data corresponding to the selected content to display an image.

14. The non-transitory computer readable medium according to claim 13, wherein the UI includes a plurality of graphic objects respectively corresponding to the plurality of contents, the graphic objects arranged to correspond to a position and a size of content images of the plurality of contents in the screen.

15. The non-transitory computer readable medium according to claim 14, wherein the transmitting the signal comprises:
- identifying a graphic object of the plurality of graphic objects corresponding to a touch position by the user input on the UI, and
- selecting the content corresponding to the identified graphic object.

16. The non-transitory computer readable medium according to claim 13, wherein the selected content is a first content, and
wherein the method further comprises:
- based on identifying that a single second content is displayed in the screen, displaying an image based on data corresponding to the second content.

17. The non-transitory computer readable medium according to claim 16, wherein the displaying the image based on the data corresponding to the second content comprises:
- obtaining the data corresponding to the second content included in the response.

18. The non-transitory computer readable medium according to claim 16, wherein the displaying the image based on the data corresponding to the second content comprises:
- obtaining address information included in the response, and
- obtaining second content data stored in a server using the address information.

\* \* \* \* \*